United States Patent
Verma et al.

(10) Patent No.: US 12,246,740 B2
(45) Date of Patent: Mar. 11, 2025

(54) COACHABLE DRIVER RISK GROUPS

(71) Applicant: NETRADYNE, INC., San Diego, CA (US)

(72) Inventors: Pratik Verma, Bengaluru (IN); Anirban Nag, Bengaluru (IN); Stephan Franklin Dunn, Kingwood, TX (US); David Jonathan Julian, San Diego, CA (US); Parag Ahire, San Diego, CA (US)

(73) Assignee: NETRADYNE, INC., San Diego, CA (US)

( * ) Notice: Subject to any disclaimer, the term of this patent is extended or adjusted under 35 U.S.C. 154(b) by 0 days.

(21) Appl. No.: 18/288,538

(22) PCT Filed: Mar. 17, 2022

(86) PCT No.: PCT/US2022/020736
§ 371 (c)(1),
(2) Date: Oct. 26, 2023

(87) PCT Pub. No.: WO2022/231721
PCT Pub. Date: Nov. 3, 2022

(65) Prior Publication Data
US 2024/0208522 A1  Jun. 27, 2024

Related U.S. Application Data

(60) Provisional application No. 63/182,735, filed on Apr. 30, 2021.

(51) Int. Cl.
*B60W 50/14* (2020.01)
*B60W 40/09* (2012.01)

(52) U.S. Cl.
CPC ............ *B60W 50/14* (2013.01); *B60W 40/09* (2013.01); *B60W 2555/60* (2020.02); *B60W 2556/10* (2020.02)

(58) Field of Classification Search
CPC .. B60W 50/14; B60W 40/09; B60W 2555/60; B60W 2556/10
See application file for complete search history.

(56) References Cited

U.S. PATENT DOCUMENTS

2013/0006674 A1  1/2013  Bowne et al.
2013/0179198 A1*  7/2013  Bowne ................. G07C 5/08
                                                     705/4

(Continued)

FOREIGN PATENT DOCUMENTS

DE  202013010566 U1  2/2015
EP  2678206 A1  1/2014
EP  3690596 A2  8/2020

OTHER PUBLICATIONS

Extended European Search Report in EP Patent Application No. 23184473.9 dated Oct. 2, 2023 (10 pages).

(Continued)

*Primary Examiner* — Daryl C Pope
(74) *Attorney, Agent, or Firm* — FOLEY & LARDNER LLP

(57) ABSTRACT

Systems and methods for selectively transmitting alerts based on monitored behavior of a driver are disclosed. A system can calculate a driver score for a driver based on a set of driving events detected from sensor data captured while a vehicle was operated by the driver. Each of the set of driving events is associated with a driving behavior in a driving scenario. The driver score is further calculated based on historic driving event data. The system can assign the driver to a category of a number of categories based on the driver score. The system can determine that a change to a habitual driving behavior in a monitored driving scenario would result in reassignment of the driver to another category. The system can transmit an alert to the vehicle based (Continued)

upon a subsequent detection of a driving event that is associated with the monitored driving scenario.

16 Claims, 17 Drawing Sheets

(56) References Cited

U.S. PATENT DOCUMENTS

| | | | |
|---|---|---|---|
| 2015/0149219 A1* | 5/2015 | Bowne | G06Q 30/0283 705/4 |
| 2017/0291611 A1 | 10/2017 | Innes et al. | |
| 2018/0345981 A1 | 12/2018 | Ferguson et al. | |

OTHER PUBLICATIONS

International Search Report and Written Opinion in International Patent Application No. PCT/US2022/020736 dated Jun. 30, 2022 (13 pages).

* cited by examiner

1600

| SCORE SIMULATOR | | |
|---|---|---|
| DRIVER: JOHN DOE | 720 → | 750 |
| | Current Score | Potential Score |
| TRAFFIC LIGHTS | 23 | 18 |
| STOP SIGNS | 8 | 5 |
| BRAKING | 3 | 2 |
| ACCELERATIONS | 7 | 2 |
| TURNS | 4 | 3 |
| U-TURNS | 5 | 3 |
| SPEEDING | 11 | 7 |
| DRIVER DISTRACTION | 46 | 34 |
| TAILGATING | 8 | 4 |
| FOLLOWING DISTANCE | 16 | 12 |
| AVERAGE FOLLOWING DISTANCE | 4 | 2 |
| DRIVER STARS | 4 | 7 |
| DRIVER STAR STREAKS | 3 | 5 |

1650

| SCORE SIMULATOR | | |
|---|---|---|
| DRIVER: JOHN DOE | 720 → | 731 |
| | Current Score | Potential Score |
| TRAFFIC LIGHTS | 23 | 18 |
| STOP SIGNS | 8 | 5 |
| BRAKING | 3 | 2 |

1670

| SCORE SIMULATOR | | | |
|---|---|---|---|
| DRIVER: JOHN DOE | 735 → | 765 | |
| | Current Score | Potential Score | |
| TRAFFIC LIGHTS | 21 | 12 | Edit / Delete |
| STOP SIGNS | 6 | 3 | Edit / Delete |
| BRAKING | 3 | 1 | Edit / Delete |

FIG. 16

COACHABLE DRIVER RISK GROUPS

CROSS-REFERENCE TO RELATED APPLICATION

This application is a U.S. National Phase Application under 35 U.S.C. § 371 of International Patent Application No. PCT/US2022/020736, filed on Mar. 17, 2022, which claims the benefit of and priority to U.S. Provisional Patent Application No. 63/182,735, filed on Apr. 30, 2021, the contents of which are incorporated herein by reference in their entireties.

FIELD OF THE DISCLOSURE

Certain aspects of the present disclosure generally relate to Intelligent Driving/Driver Monitoring Systems (IDMS), Advanced Driver Assistance Systems (ADAS), and Autonomous Driving Systems, and more particularly to systems and methods for allocating drivers into coachable driver risk groups.

BACKGROUND

Vehicles are typically operated and controlled by human drivers. Through training and with experience, a human driver may learn how to drive a vehicle safely and efficiently in a range of conditions or contexts. For example, as an automobile driver gains experience, he may become adept at driving in challenging conditions such as rain, snow, or darkness.

Drivers may sometimes drive unsafely or inefficiently. Unsafe driving behavior may endanger the driver and other drivers and may risk damaging the vehicle. Unsafe driving behavior may also lead to accidents, which may cause physical harm, and may lead to an increase in insurance rates for operating a vehicle. Inefficient driving, which may include hard accelerations, may increase the costs associated with operating a vehicle.

Legacy driving/driver monitoring systems may be based on detections of large inertial sensor readings. Such events are then typically reviewed by human operators to determine whether the large inertial sensor reading corresponds to a particular type of unsafe and/or inefficient driving event, such as hard-braking, hard-turning, a collision, and the like. Such systems are typically incapable of detecting certain common driving events that are not accompanied by a large inertial sensor reading. Other systems, which may detect driving events based on video processing, may detect a greater number and range of driving events, including driving events that would be ignored by inertial-based systems. For such video-processing based systems, however, there may be challenges regarding the effective use of the available data. For example, the amount of available data may overwhelm the safety management and coaching resources available at a typical driving fleet.

Accordingly, certain aspects of the present disclosure are directed to systems and methods that may enable fleets to effectively harness data flows made available by driver safety systems that detect driving events based at least in part on video processing.

SUMMARY

Certain aspects of the present disclosure generally relate to providing, implementing, and using a method of allocating drivers into coachable driver risk groups. The methods may involve a camera sensor and/or inertial sensors to detect traffic events, as well analytical methods that may determine an action by a monitored driver that is responsive to the detected traffic event.

Certain aspects of the present disclosure generally relate to providing, implementing, and using a method of allocating drivers into coachable driver risk groups. Certain aspects of the present disclosure provide an apparatus configured to allocate drivers into coachable driver risk groups. Certain aspects of the present disclosure provide a computer program product for allocating drivers into coachable driver risk groups At least one aspect of the present disclosure is directed to method of selectively transmitting alerts based on monitored behavior of a driver. The method can be performed, for example, by one or more processors coupled to memory. The method can include calculating a driver score for the driver based on a set of driving events detected from sensor data captured while a vehicle was operated by the driver. Each driving event of the set of driving events can be associated with at least one monitored driving behavior of a plurality of monitored driving behaviors. The driver score can be further based on historic driving event data. The method can include assigning the driver to a category of a plurality of categories based on the driver score. The method can include determining that an improvement to a monitored driving behavior of the plurality of monitored driving behaviors would result in reassignment of the driver to another category of the plurality of categories. The method can include transmitting an alert to the vehicle based upon the determination that the improvement to the monitored driving behavior would result in reassignment of the driver to another category.

In some implementations, the set of driving behaviors comprise a behavior of the driver at a stop sign and a behavior of the driver at a traffic light. In some implementations, calculating the driver score for the driver is based on at least the behavior of the driver at the stop sign and the behavior of the driver at the traffic light. In some implementations, assigning the driver to a category of the plurality of categories can include determining that the driver score falls within a range associated with the category.

In some implementations, determining that the improvement to the monitored driving behavior would result in reassignment of the driver to another category can include determining a contribution amount of the monitored driving behavior to the driver score. In some implementations, determining that the improvement to the monitored driving behavior would result in reassignment of the driver to another category can include determining that a change to the contribution amount of the monitored driving behavior would change the driver score to fall within a range of a second category of the plurality of categories.

In some implementations, transmitting the alert to the vehicle can include detecting, from second sensor data captured by the vehicle operated by the driver, the driving event that is associated with the monitored driving behavior. In some implementations, generating the alert can be responsive to detecting the driving event. In some implementations, the plurality of monitored driving behaviors include one or more of an unsafe speed, an unsafe following distance, and a non-compliant behavior around traffic signs or traffic lights.

In some implementations, determining that an improvement to a monitored driving behavior would result in reassignment of the driver to another category can include determining a frequency of the monitored driving behavior based on the set of driving events. In some implementations, the plurality of categories can each correspond to a respective likelihood that the driver will be in an accident. In some implementations, transmitting the alert to the vehicle can include receiving an indication of the subsequent detection of the driving event that is associated with the monitored driving behavior. In some implementations, transmitting the alert to the vehicle can include transmitting the alert to the vehicle responsive to receiving the indication of the subsequent detection of the driving event that is associated with the monitored driving behavior. In some implementations, transmitting the alert to the vehicle can include transmitting instructions that enable the vehicle to alert the driver upon the subsequent detection of the driving event that is associated with the monitored driving behavior.

At least one other aspect of the present disclosure is directed to a system for selectively transmitting alerts based on monitored behavior of a driver. The system can include, for example, one or more processors coupled to a non-transitory memory. The system can calculate a driver score for the driver based on a set of driving events detected from sensor data captured while a vehicle was operated by the driver. Each driving event of the set of driving events can be associated with at least one monitored driving behavior of a plurality of monitored driving behaviors. The driver score can be further based on historic driving event data. The system can assign the driver to a category of a plurality of categories based on the driver score. The system can determine that an improvement to a monitored driving behavior of the plurality of monitored driving behaviors would result in reassignment of the driver to another category of the plurality of categories. The system can transmit an alert to the vehicle based upon the determination that the improvement to the monitored driving behavior would result in reassignment of the driver to another category.

In some implementations, the set of driving behaviors comprise a behavior of the driver at a stop sign and a behavior of the driver at a traffic light. In some implementations, the system can calculate the driver score for the driver based on at least the behavior of the driver at the stop sign and the behavior of the driver at the traffic light. In some implementations, to assign the driver to a category of the plurality of categories, the system can determine that the driver score falls within a range associated with the category.

In some implementations, to determine that the improvement to the monitored driving behavior would result in reassignment of the driver to another category, the system can determine a contribution amount of the monitored driving behavior to the driver score. In some implementations, to determine that the improvement to the monitored driving behavior would result in reassignment of the driver to another category, the system can determine that a change to the contribution amount of the monitored driving behavior would change the driver score to fall within a range of a second category of the plurality of categories.

In some implementations, to transmit the alert to the vehicle, the system can detect, from second sensor data captured by the vehicle operated by the driver, the driving event that is associated with the monitored driving behavior. In some implementations, to transmit the alert to the vehicle, the system can generate the alert responsive to detecting the driving event. In some implementations, the plurality of monitored driving behaviors includes one or more of an unsafe speed, an unsafe following distance, and a non-compliant behavior around traffic signs or traffic lights.

In some implementations, to determine that an improvement to a monitored driving behavior would result in reassignment of the driver to another category, the system can determine a frequency of the monitored driving behavior based on the set of driving events. In some implementations, the plurality of categories can each correspond to a respective likelihood that the driver will be in an accident. In some implementations, to transmit the alert to the vehicle, the system can receive, from the vehicle, an indication of the subsequent detection of the driving event that is associated with the monitored driving behavior. In some implementations, to transmit the alert to the vehicle, the system can transmit the alert to the vehicle responsive to receiving the indication of the subsequent detection of the driving event that is associated with the monitored driving behavior. In some implementations, to transmit the alert to the vehicle, the system can transmit, to the vehicle, instructions that enable the vehicle to alert the driver upon the subsequent detection of the driving event that is associated with the monitored driving behavior.

Various embodiments disclosed herein are related to a method of selectively transmitting alerts based on monitored behavior of a driver. The method includes calculating, by one or more processors, a driver score for the driver based on a set of driving events, wherein each driving event of the set of driving events was detected from sensor data captured while a vehicle was operated by the driver, and wherein each driving event of the set of driving events is associated with a driving behavior in at least one driving scenario of a plurality of driving scenarios. The method further includes assigning, by the one or more processors, the driver to a category based on the driver score, wherein the category is one of a plurality of categories. The method further includes determining, by the one or more processors, that a change in a habitual driving behavior by the driver in a monitored driving scenario would result in reassignment of the driver to another category of the plurality of categories, wherein the monitored driving scenario is a driving scenario of the plurality of driving scenarios. The method further includes transmitting, by the one or more processors, an alert to a vehicle operated by the driver based upon the determination that the change in the habitual driving behavior by the driver in the monitored driving scenario would result in reassignment of the driver to another category.

The plurality of driving scenarios may include a stop sign scenario and a traffic light scenario. Calculating the driver score for the driver may be based on at least a habitual driving behavior of the driver in the stop sign scenario and a habitual driving behavior of the driver in the traffic light scenario.

Assigning the driver to the category further may include determining, by the one or more processors, that the driver score falls within a range associated with the category.

Determining that the change in the habitual driving behavior by the driver in the monitored driving scenario would result in reassignment of the driver to another category may further include determining, by the one or more processors, a contribution amount of the monitored driving scenario to the driver score, and further, determining, by the one or more processors, that a change to the contribution amount of the monitored driving behavior would change the driver score to fall within a range of a second category of the plurality of categories.

Optionally, transmitting the alert to the vehicle further includes detecting, by the one or more processors, from second sensor data captured by the vehicle operated by the driver, a driving event that is associated with the monitored driving scenario, and further, generating, by the one or more processors, the alert responsive to detecting the driving event.

The habitual driving behavior may be one of an unsafe speed, an unsafe following distance, and a non-compliant behavior around traffic signs or traffic lights.

Determining that the change in the habitual driving behavior by the driver in the monitored driving scenario would result in reassignment of the driver to another category may further include determining, by the one or more processors, a frequency of the habitual driving behavior based on the set of driving events.

The plurality of categories may each correspond to a respective likelihood that the driver will be in an accident based.

Transmitting the alert to the vehicle operated by the driver may further include receiving, by the one or more processors from the vehicle operated by the driver, an indication of a subsequent detection of a driving event that is associated with the monitored driving scenario, and further, transmitting, by the one or more processors, the alert to the vehicle operated by the driver responsive to receiving the indication of the subsequent detection of the driving event that is associated with the monitored driving scenario.

Transmitting the alert to the vehicle operated by the driver may further comprise transmitting, by the one or more processors to the vehicle operated by the driver, instructions that enable the vehicle operated by the driver to alert the driver upon a subsequent detection of a driving event that is associated with the monitored driving scenario.

Various embodiments disclosed herein are related to a system for selectively transmitting alerts based on monitored behavior of a driver. The system includes one or more processors coupled to a non-transitory memory, the one or more processors configured to calculate a driver score for the driver based on a set of driving events, wherein each driving event of the set of driving events was detected from sensor data captured while a vehicle was operated by the driver, and wherein each driving event of the set of driving events is associated with at least one driving behavior in at least one driving scenario of a plurality of driving scenarios. The one or more processors are further configured to assign the driver to a category based on the driver score, wherein the category is one of a plurality of categories. The one or more processors are further configured to determine that a change in a habitual driving behavior by the driver in a monitored driving scenario would result in reassignment of the driver to another category of the plurality of categories, wherein the monitored driving scenario is a driving behavior of the plurality of driving behaviors. The one or more processors are further configured to transmit an alert to a vehicle operated by the driver based upon the determination that the change in the habitual driving behavior by the driver in the monitored driving scenario would result in reassignment of the driver to another category.

The plurality of driving behaviors may include a stop sign scenario and a traffic light scenario, and the one or more processors may be further configured to calculate the driver score for the driver based on at least a habitual driving behavior of the driver in the stop sign scenario and a habitual driving behavior of the driver in the traffic light scenario.

To assign the driver to the category, the one or more processors may be further configured to determine that the driver score falls within a range associated with the category.

To determine that the change to the habitual driving behavior in the monitored driving scenario would result in reassignment of the driver to another category, the one or more processors may be further configured to determine a contribution amount of the monitored driving scenario to the driver score, and further to determine that a change to the contribution amount of the monitored driving scenario would change the driver score to fall within a range of a second category of the plurality of categories.

To transmit the alert to the vehicle, the one or more processors may be further configured to detect, from second sensor data captured by the vehicle operated by the driver, a driving event that is associated with the monitored driving scenario, and further to generate the alert responsive to detecting the driving event.

The habitual driving behavior may be one of an unsafe speed, an unsafe following distance, and a non-compliant behavior around traffic signs or traffic lights.

To determine that the change in habitual driving behavior in the monitored driving scenario would result in reassignment of the driver to another category, the one or more processors may be further configured to determine a frequency of the habitual driving behavior based on the set of driving events.

The plurality of categories may each correspond to a respective likelihood that the driver will be in an accident.

To transmit the alert to the vehicle operated by the driver, the one or more processors may be further configured to receive, from the vehicle operated by the driver, an indication of a subsequent detection of a driving event that is associated with the monitored driving scenario, and further to transmit the alert to the vehicle operated by the driver responsive to receiving the indication of the subsequent detection of the driving event that is associated with the monitored driving scenario.

To transmit the alert to the vehicle operated by the driver, the one or more processors may be further configured to transmit, to the vehicle operated by the driver, instructions that enable the vehicle operated by the driver to alert the driver upon a subsequent detection of a driving event that is associated with the monitored driving scenario.

BRIEF DESCRIPTION OF THE DRAWINGS

FIG. 16 illustrates a score simulator in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, data networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Vision-Based Monitoring at Scale

Substantially continuous vision-based monitoring of driver behavior enables insight into instances and patterns of risk that may not be discernible by inertial-trigger-based driver monitoring systems. An artificial intelligence (AI) dashboard camera (a "dash cam") system featuring on-device visual processing, such as a DRIVERI™ produced by NETRADYNE™, may perform visual analysis on the edge device and with a precision that obviates the human review of an inertial based system.

Figure 1:
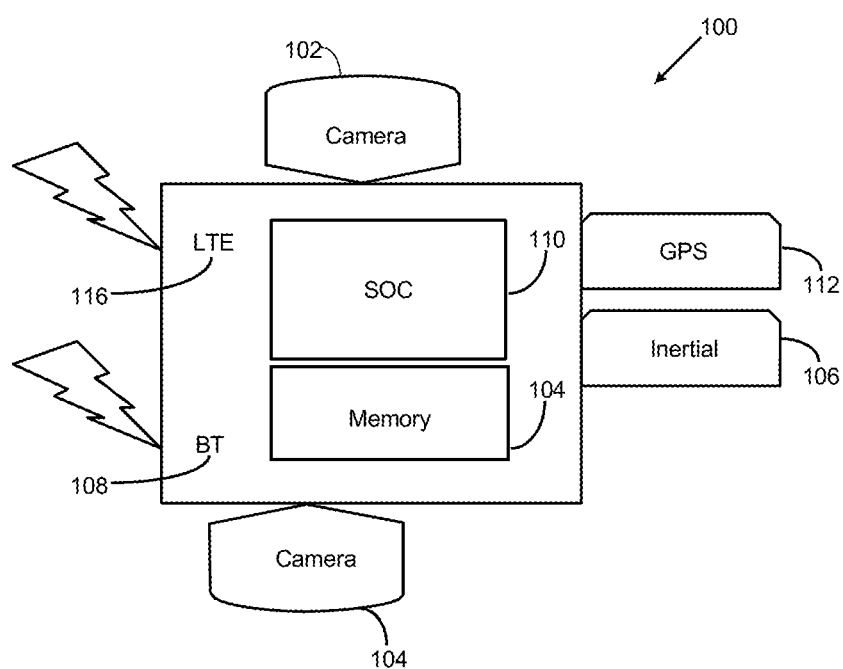
FIG. 1 illustrates an example of a driver safety device in accordance with certain aspects of the present disclosure.

An example of a device 100 that contains a processor configured to perform visual analysis in accordance with certain aspects of the present disclosure is illustrated in FIG. 1. The device 100 may include a central processing unit (CPU), a graphics-processing unit (GPU) and/or a specialized deep learning processor (which may be integrated into a System-on-a-Chip (SOC) 110), memory storage 114, four cameras (two cameras 102 and 104 are shown), communication channels (which may include Bluetooth (BT) 108 and Long-Term Evolution (LTE) 116 communication channels), and integrated inertial sensors 106. The system may be further configured to access wheel odometry via a wired or wireless connection directly to the sensor path or via a controller area network (CAN) Bus. The system may also include a Global Positioning System (GPS) 112, which may include an antenna that is integrated into a motherboard that also contains the SOC 110, or that may be placed at another location on the vehicle, such as on the roof.

Figure 2:
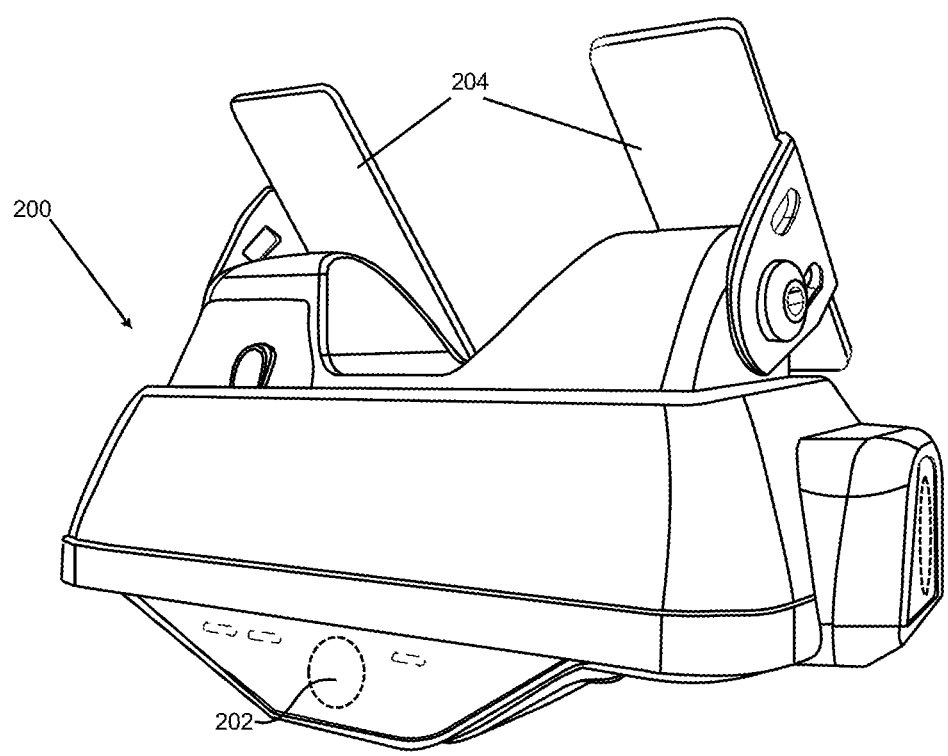
FIG. 2 illustrates an example of a driver safety device in accordance with certain aspects of the present disclosure.

The device 100 may be integrated into a device body 200 as illustrated in FIG. 2. The device body 200 may include one or more camera apertures, such as a driver-facing camera aperture 202. The system may be considered a vision-based Internet-of-Things (IOT) driving monitoring system, an intelligent dash cam system, an AI dash cam, or the like. The device body 200 may include mounting brackets 204 which may facilitate mounting of the device to a windshield of a vehicle. The device 100 can be used to monitor driving behaviors as the vehicle is operated by a driver. The device 100 may be associated with an identifier of the driver or may visually authenticate the driver or may log in the driver by other suitable means, such that driving events or driving behaviors monitored by the device 100 may be associated with the driver when performing various operations as described herein.

An application of certain aspects of the present disclosure may yield improved functioning of a Virtual Safety Manager. As described in PCT Patent Application PCT/US2020/061620, filed on Nov. 20, 2020, and entitled "VIRTUAL SAFETY MANAGER," which is incorporated by reference herein in its entirety, a Virtual Safety Manager may operate in a manner that is complementary to a human Safety Manager. As illustrated in the comparison diagram 300 in FIG. 3, a human coach may make one or more subjective decisions in the course of coaching driving behaviors.

These subjective decisions can be based on, for example, the video data 310 which may be captured by a camera mounted in a vehicle (e.g., the camera 102 of the device 100 shown in FIG. 1, etc.). The human coach may make subjective decisions based on a variety of factors, including any alerts 305 that may have been provided to the driver (e.g., which can include any visual or inertial alerts), or based on other information indicated in the video data 310. The video data 310 can be transmitted or otherwise provided to a computing device that is used by the human coach to analyze driving data.

When analyzing driving behavior of a driver, the human coach may first select which alert types 320 to coach, which may be based at least in part on subjective criteria. The human coach may then select alert examples 330 from within the chosen alert type 320 category. However, this selection may be based on incomplete information, as the human coach may be unlikely to review all available data points. In addition, the human coach might choose examples based on subjective rather than objective criteria, which often results in inconsistent or ineffective results.

Figure 3:
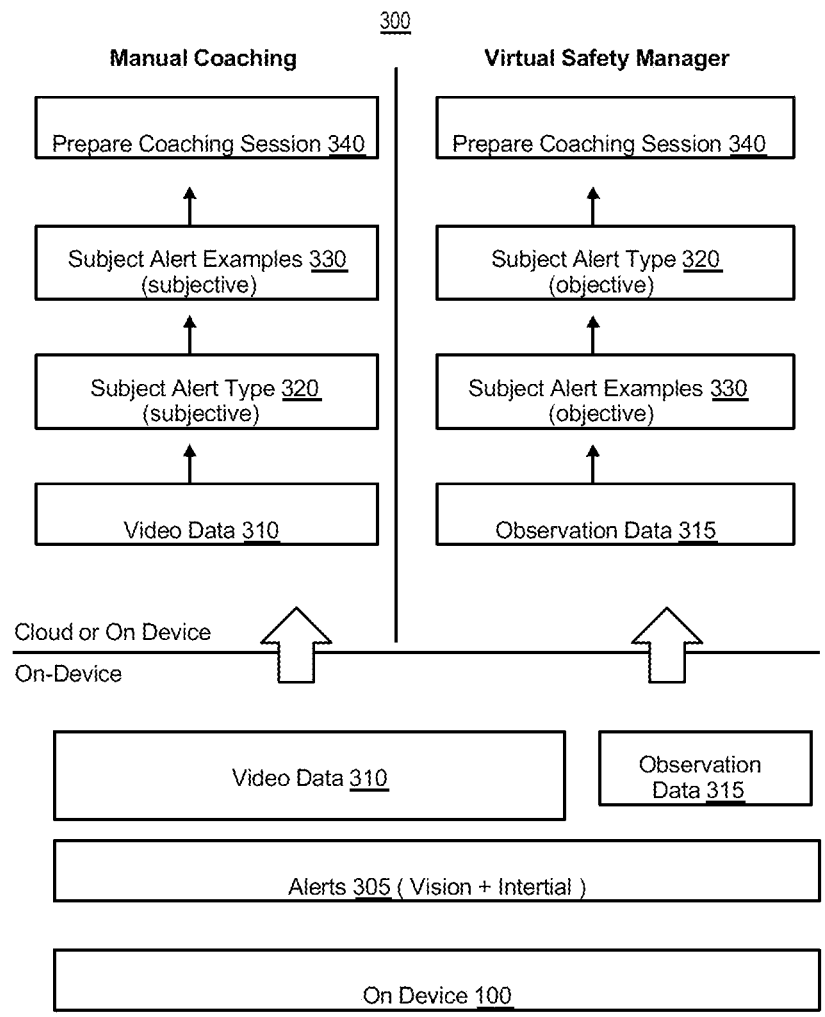
FIG. 3 illustrates an example of allocating drivers into coachable driver risk groups in accordance with certain aspects of the present disclosure.

As illustrated on the right column of the comparison diagram 300 in FIG. 3, a Virtual Safety manager may improve upon human selection in at least two respects. First, the Virtual Safety Manager may objectively evaluate all of the alert examples 330 that may be available in a coaching period. This may be achieved by, for example, determining a coachability score for each alert example 330 as it is recorded, periodically, and/or on an as-needed basis, as described below. Second, the Virtual Safety Manager may focus on alert types 320 on which to coach based on a data-driven assessment of which driving behaviors may have the greatest need for improvement. As a consequence, the Virtual Safety Manager may be free from biases that may become incorporated into analogous human safety manager workflows due to subjective and/or inconsistent decisions that occur through that process.

Coachable Driving Behaviors

Figure 4:
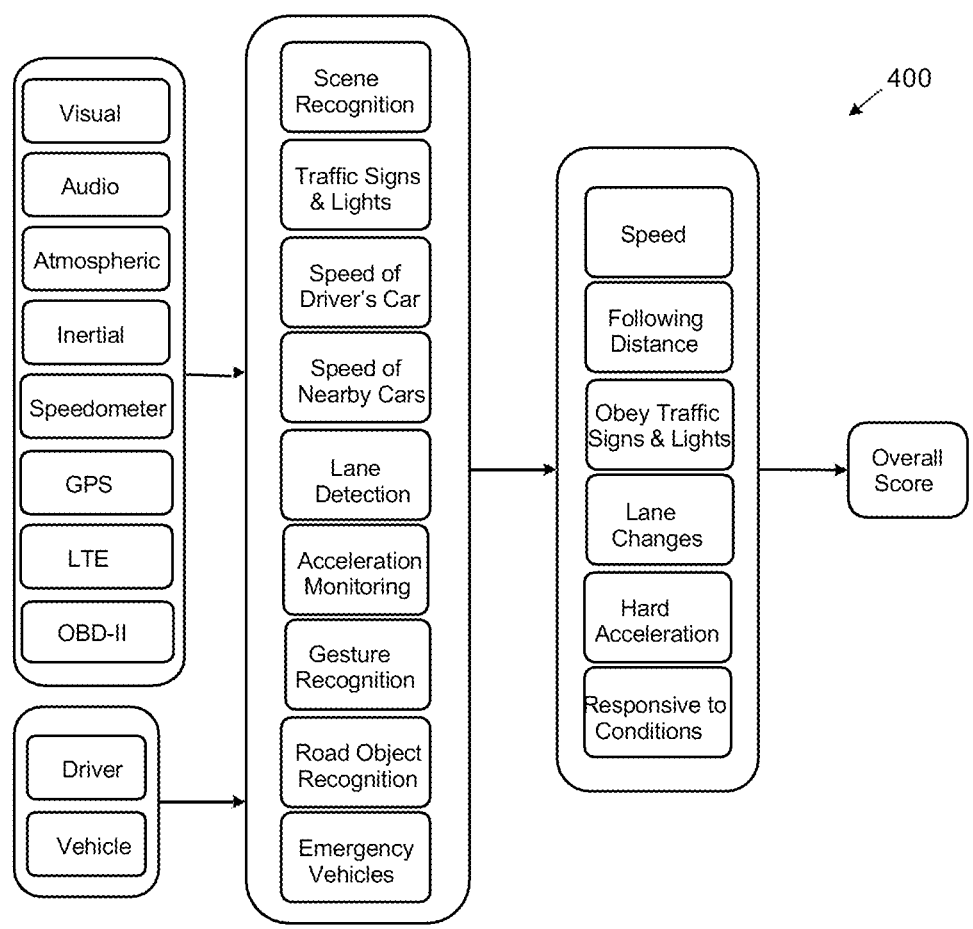
FIG. 4 illustrates an example of allocating drivers into coachable driver risk groups in accordance with certain aspects of the present disclosure.

An IDMS may detect that a driver was involved in a variety of unsafe driving events. For example, as illustrated in FIG. 4, unsafe driving events that may be determined by an IDMS 400 may include unsafe speed, unsafe following distance, non-compliant behavior around traffic signs and lights, and the like. Unsafe driving events may be detected, for example, by a device (e.g., the device 100 described in connection with FIG. 1) within a vehicle that executes the IDMS and monitors driving conditions as the vehicle is operated. Driving events detected by the IDMS may be transmitted to a remote server, which can selectively transmit alerts to the vehicle to improve driving behavior.

Figure 5:
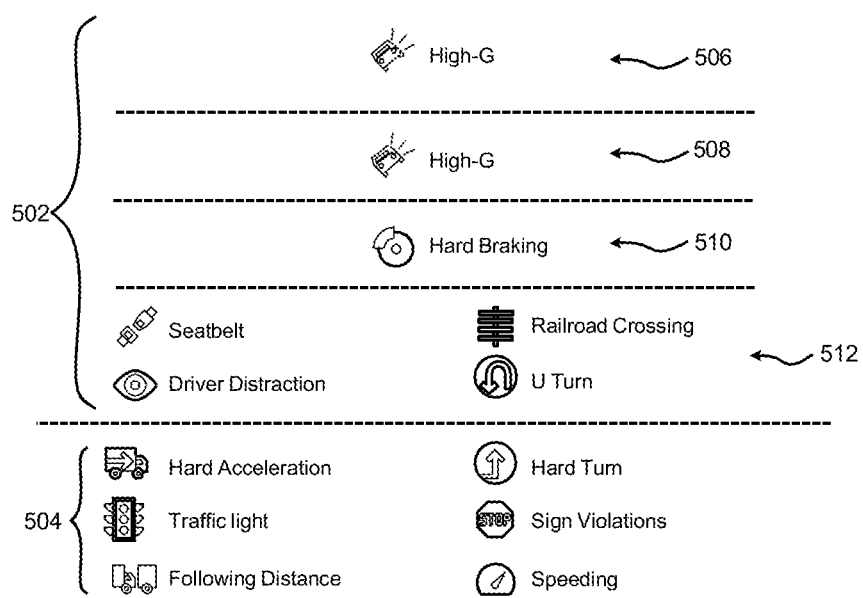
FIG. 5 illustrates an example of allocating drivers into coachable driver risk groups in accordance with certain aspects of the present disclosure.

FIG. 5 illustrates alert types that may correspond to IDMS-detectable driving scenarios, such as those shown in FIG. 4. As illustrated in FIG. 5, alert types may be broadly segregated into two groups. A first group 502 of alerts may be coached on the basis of a single observation (uploaded IDMS alert). A second group 504 of alerts may be more typically coached on the basis of a number of alerts of the same type. The distinction between the first group 502 and the second group 504 may correspond to a cut-off line in an ordering of alert type by decreasing intensity, starting with a severe High-G event type 506, which may correspond to a crash (collision). Such an event may be the subject of immediate coaching and may often be the subject on an urgent response. Accordingly, a response to a severe High-G event may include utilization of accident reporting tools.

One level down in FIG. 5 is a moderate High-G event type 508. A moderate High-G event may be distinguished from a severe High-G event based on an intensity of an inertial trace. A moderate High-G event may correspond to a collision, but in comparison to a severe High-G event, may have a higher prevalence of false alarms. Accordingly, the occurrence of a moderate High-G event may trigger the use of methods and tools that may facilitate investigation of putative accident context. This review may be used to verify that an accident occurred. The review may also be used more broadly to provide additional context around a verified accident.

The third level from the top of FIG. 5 illustrates a Hard Braking event type 510. Events of this type may indicate that a driver came to a sudden stop. Accordingly, these events may correspond to a "near miss," which may be considered a collision that almost occurred, but which the driver was able to avoid due to a hard brake. These events are often effective coaching examples.

The fourth level down from the top of FIG. 5 includes a number of detectable driving event types that may indicate a policy violation by a driver. These event types may be considered as members of a collective policy violation type 512, or may be considered individually, for the purposes of "bucketizing" alert types. Examples of such policy violations include failure to wear a seatbelt, certain forms of driver distraction such as texting on a phone, crossing a railroad without coming to a complete stop, or performing a U-turn.

Other unsafe driving events that may be categorized as "instantly coachable" may include severe following distance alerts, collision warnings, lane departure warnings, distracted driving, weaving, and certain traffic light, or stop sign behaviors. This list is merely illustrative, and that different embodiments may incorporate more or fewer alert types, different severity ranking, and different combinations in comparison to the alert types and ranking illustrated in FIG. 5.

One severity level down from "instantly coachable" may be a group 504 of detectable driving behaviors in driving scenarios that correlate with accident risk, but that are so frequent that it may be impractical or ineffective to respond to each occurrence. Examples of such alerts are illustrated at the bottom of FIG. 5. These may include Hard Acceleration, Hard Turns, minor Traffic Light violations, minor traffic sign violations, moderate following distance alerts, and minor speeding violations.

Figure 6:
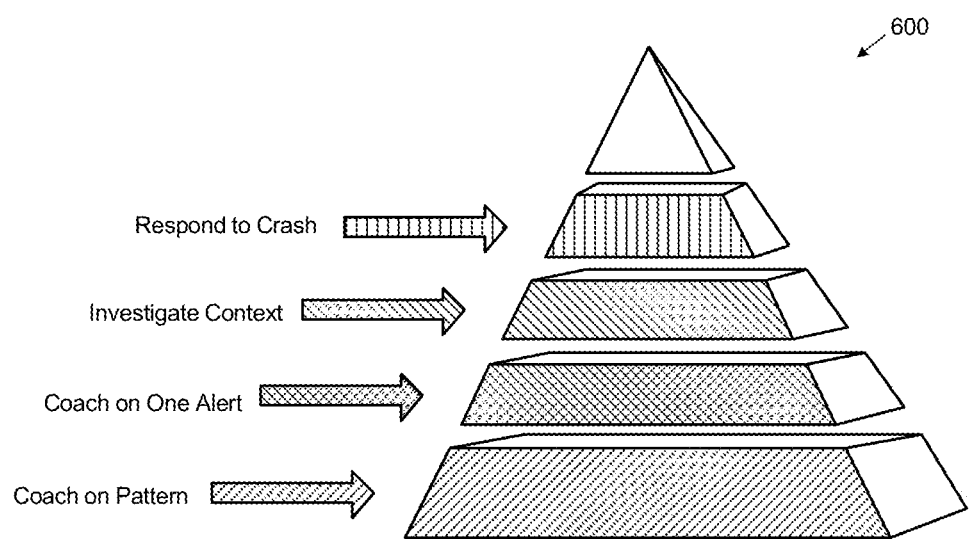
FIG. 6 illustrates an example of allocating drivers into coachable driver risk groups in accordance with certain aspects of the present disclosure.

FIG. 6 illustrates a stacked pyramid 600 that corresponds to common events and their associated coaching activities in safety-related fields. At the top of the pyramid are fatalities and serious accidents. Going down the pyramid are layers corresponding to an accident, such as minor accidents, near misses, and finally, unsafe acts. Each layer of the pyramid is broader than the layer above it owing to the relative frequency of the observed events. For events corresponding to the second layer of the pyramid (which includes collisions), a need to respond to the crash is likely to outweigh the importance of coaching the driver on the driving scenario that led to the crash. For events corresponding to the next layer (which includes minor accidents), the coach may first need to investigate the context of each detected driving event. In the next layer (which includes near misses), coaching on each detected event, in other words, each observation of a particular unsafe driving act may be appropriate. Finally, for detectable events in the bottom layer (which correspond to unsafe acts, but that are not themselves so unsafe as to trigger an immediate response, it may be more effective to coach based on patterns of driving behaviors which may be detected by devices (e.g., the device 100) that monitor driving behaviors of a driver as they operate a vehicle.

As explained below, patterns of behaviors corresponding to the bottom layer of the stacked pyramid 600 may reflect habitual driving behaviors in particular driving scenarios. When such habitual driving behaviors are detected, the level of risk of any one event may be so low and the frequency of similar detections so high, that it may be impractical for a human coach to effectively coach the driver on the behavior. In addition, because repeatedly occurring unsafe acts are often habitual, the driver may repeat these patterns of behavior without conscious awareness, and so it may be ineffective to attempt to train the driver based on traditional coaching techniques. Accordingly, certain aspects of the present disclosure are directed to identifying a habitual driving behavior of a driver in a particular driving scenario (the monitored driving scenario) and then transmitting feedback to the driver at moments that are close in time to each detection of the identified habitual driving behavior. Likewise, in some embodiments, a different form of feedback may be transmitted to the driver at moments that are close in time to each detection of a relatively safer driving behavior in the same monitored driving scenario. Based on the physiology of habit formation circuits in the brain, as further explained below, this approach may facilitate the weakening or unlearning of unsafe habitual driving behaviors and the formation of safer driving habits in a monitored driving scenario.

The pyramidal shape is meant to convey the ratio of occurrences of these types of safety events and the importance of regular coaching to avoid accidents. While the precise values of the ratios often vary in different fields, coaching based on driving behavior patterns occur generally, while coaching for each one alert generated in response to a particular unsafe driving act may occur less frequently. Likewise, investigating a context of a particular driving incident or driving behavior may occur less commonly than general coaching, and responding to a crash is the least frequently coached driving event due to the infrequency of crashes. Put another way, a driver behavior monitoring system may be expected to provide more alerts for observations of unsafe acts than for serious driving violations. With respect to coaching strategies, a human safety manager may choose to deliver coaching messages in response to all or substantially all serious driving violations that are detected by a driving monitoring system. This approach may be feasible because such events are relatively rare. A different approach, however, is required to change habitual driving behaviors that manifest themselves in common unsafe driving acts, in part because such events are so numerous.

Selecting Which Drivers to Coach

Embodiments of certain aspects of the present disclosure may include methods of automatically selecting which drivers to coach, which may include ranking drivers based on coaching need, categorizing drivers into groups that include "schedule for coaching" and "do not schedule for coaching at this time" and the like. Selection techniques may be directed to measures of driving behavior that are predictive of accident risk. As described herein, such measures may include a driver's score (which may be a GREENZONE™ summary safety score by NETRADYNE™, also referred to as a "score"), may include measures reflective of score components, specific behavioral trends, and the like. These metrics may correspond to a driver's compliance with various traffic rules, company policies, and the like. At a timescale that may be considered intermediate, between an immediate or urgent reactive response to an accident and a more deliberately scheduled response based on metrics that are predictive of future risk, a driver may be selected for coaching based on a notification of a positive or negative change in a driver's score. Furthermore, in some embodiments of certain aspects of the present disclosure, selection of which drivers to coach may be based on data sources that vary on a longer timescale. For example, a driver selection module of a virtual safety manager may incorporate lifetime learning metrics. Such metrics may include metrics reflective of the opportunity for change, based on whether the driver might be in a trajectory of habit formation and solidification.

A virtual safety manager may generate a list or ranking of drivers to be coached for a fleet. Selection criteria may be based on configurations set by the fleet, such as by a safety manager. Further, it may be based on a driver score, so that the list of drivers to be coached includes all drivers having a score that is below a set threshold.

In some embodiments, the drivers to be coached may be all drivers having a score less than a threshold in a given time period. In some embodiments, drivers may be selected based on whether they are in the bottom quartile of all drivers in the fleet with respect to the score. Of course, the number of drivers that are coached in a particular period may be matched to the availability of coaches.

Likewise, the selection of which drivers to coach may be based on a number of alerts for each driver organized by an alert type corresponding to a driving scenario. For example, drivers who have exceeded a threshold number of alerts (events in which the unsafe driving behavior was detected) in a traffic sign scenario may be flagged for coaching. Compliance levels expressed as a percentage of compliant driving actions based on the number of opportunities for a compliant driving action may also be used to select drivers for coaching. For example, drivers who failed to come to a complete stop at more than two percent of stop signs that they encountered within a month may be flagged for coaching. In some embodiments, a virtual safety manager may facilitate the creation of a rule based on one or more data points and a comparator to a threshold, such as in the examples described above.

In a typical embodiment of certain aspects of the present disclosure, a virtual safety manager may be configured to identify the drivers who are most likely to get into an accident in the near future. This list may be used to select which drivers should be coached. In some embodiments, the virtual safety manager may determine a risk of accident in a three-month period.

A determination of accident risk may be based on a combination of metrics which themselves may not indicate participation in an accident, but which may indicate a habitual driving behavior in a driving scenario (i.e., the way in which the driver usually behaves in that particular driving scenario), for which the habitual driving behavior corresponds to having increased accident risk over time. Metrics of this sort may include frequency and severity of certain IDMS alert types, including hard braking, following too close, hard acceleration and turning, excessive lane changes, swerving, and the like. These alerts may correspond to driving behaviors corresponding to driving scenarios that a virtual safety manager may be configured to emphasize, as described in the previous section. In addition, an automated system may determine that a component of a driver's score associated with a certain driving scenario is contributing to the driver's score to such a degree that it may be considered likely that the driver's driving behavior in that scenario is habitually unsafe. The system may then selectively transmit alerts to a vehicle operated by the driver so that the driver is presented with alerts around the time that the driver exhibits an unsafe driving behavior in that identified scenario.

Accordingly, a virtual safety manager may identify drivers with higher accident risk by identifying the drivers in the fleet that exhibit the most unsafe behaviors that are known or thought to correlate with accident risk. The virtual safety manager may thereby facilitate the provision of coaching resources to these identified drivers.

In one embodiment, drivers may be selected based on a driver score, such as a summary safety score. The virtual safety manager may sort the scores for each driver of the fleet to provide an initial assessment of who is doing well or who may need improvement. The virtual safety manager may then recognize those drivers that are doing well (either automatically, via a notification to a human operator, or via social coaching techniques described below, and the like), and may assign coaching to drivers with low scores.

Alternatively, or in addition, drivers may be selected for coaching based on alert trends. In this example, the virtual safety manager may sort a count, frequency (e.g., count per week), or rate (e.g., count per mile driven in a relevant setting) of high-risk alerts. Examples of such alerts, may include speeding, following distance, stop signs, and traffic lights. Identifying drivers with a high frequency of certain types of alerts may be used to augment a selection based on the score, which may be a summary score across multiple driving behaviors (across multiple alert types). Likewise, sorting may be performed based on individual or groups of factors that contributed to each driver's score. Coaching may then be assigned to drivers who exhibit the highest number (or frequency, or rate, as described below) of particular driving behaviors, even if certain selected drivers have above average summary scores.

As just described, a fleet's riskiest drivers may be identified using summary scores of each driver. In one embodiment, a driver's score may be based on a raw count of observed unsafe behaviors. Alternatively, a driver's score may be based on a normalized count of observed unsafe behaviors, such as a count of observed unsafe behaviors that is normalized by a number of opportunities to exhibit such behavior, miles driven, period of time and the like. For example, a driver's score for stop sign behavior in a given period of time may be computed as a number of times that a driver rolled through a stop sign divided by (normalized by) the number of applicable stop signs that the driver encountered in that period of time. Approaching an applicable stop sign may be considered a driving scenario: rolling through a stop sign may be considered an unsafe driving behavior in the stop sign scenario. In addition, observed unsafe driving behaviors may be weighted according to the severity of individual events in relation to other events in the same class of events. Continuing with the stop sign behavior score example, the score may be weighted based on the speed at which a driver rolled through certain stop signs.

A driver's score, such as a summary safety score, may include multiple components. For example, in addition to a score component for stop sign behavior, described above, a second score component may reflect the driver's traffic light behavior. This component may be computed in an analogous fashion. For a given period of time, the number of times that the driver passed through an intersection when a traffic light corresponding to the driver's lane and direction of travel was red (a traffic light violation behavior in a traffic light driving scenario) may be divided by the total number of intersections with traffic lights that the driver encountered. Furthermore, individual traffic light violations that contribute to the summary traffic light component score may be weighted depending on a determined severity of the violation, where the severity may depend on the density of traffic at the intersection, the amount of time that the driver had to stop before the light turned red, the distance to the traffic light when it turned yellow or red, and the like.

In an embodiment in which a driver's score is comprised of multiple components, each of the components may be weighed differently in a manner that reflects a relative priority of the behavior. Continuing with the example above, a driver's score may include a stop sign component and a traffic light component. Considering that historical data may show that more accidents occur when a driver runs a red light than when a driver rolls through a stop sign, the traffic light component may be weighted more heavily. Accordingly, a driver's composite score may provide a summary metric that correlates with accident risk, accident risk weighted by expected loss, and the like.

Other driver score components may be based on continuous measures of driving compliance. For example, a speeding component score may consider the amount of time spent driving below a posted or fleet-specific speed limit. In some embodiments, the speeding score may be based on duration and severity of speeding normalized by the amount of time that the driver was travelling faster than 10 miles per hour less than the speed limit (to restrict the analysis to times that the driver could have been speeding). This may be considered an open-road scenario in the context of which speeding may be considered an unsafe driving behavior. By normalizing in this way, a speeding score component may be more fairly compared across drivers who spend relatively more or less time in dense traffic when speeding is not even practical.

A driver score or individual driver score component may give fleet management a snapshot of a driver's level of risk for a time period being examined. A lower score may indicate a greater level of risk. Accordingly, drivers with the lowest driver scores may be selected with a higher priority when assigning coaching resources.

In some embodiments, a virtual safety manager may select drivers having the lowest composite driver scores in a time-period of interest, such as the previous week or month. Alternatively, the driver scores may be sorted based on a rolling time-window.

In some embodiments, a virtual safety manager may sort drivers from a subset of the fleet that reports to a particular dispatcher, coach, or the like. In this way, driver selection may be adapted to the availability of a particular dispatcher or coach.

Coachable Risk Groups

Drivers may be assigned to risk groups, which may be referred to herein as a "risk category" or a "category." For example, a first risk group may comprise drivers that collectively are expected to experience three collisions per 1 million miles driven. A second risk group may comprise drivers that collectively are expected to experience two collisions per 1 million miles driven, a third group may comprise drivers that collectively are expected to experience one collision per 1 million miles driven, and so on. In this example, the collision risk may be pre-determined so that the collision risk level may be expressed simply as a whole number. This may make it easier for a given driver to understand the level of collision risk that his or her style of driving entails.

In some embodiments, drivers may be assigned to groups based on a population size. For example, each risk group may include 20% of the driver population. A first group may include the drivers with highest collision risk, a second group may include the drivers with the highest collision risk out of the drivers who are not in the first group, and so on.

For each Risk Group, the drivers in the group might have different safety profiles. For example, one driver might exhibit a propensity to run red lights. For a second driver in the same group, speeding might be the biggest problem. While the group is composed of drivers having different driving profiles, based on the teachings herein disclosed, there may be some consistency about the level of collision risk within the group. For example, different random subsamples of drivers in the Risk Group would be expected to experience collisions at comparable rates. As noted above, members of Risk Group 1 might as have an expectation of getting into three collisions per million miles. Members in Risk Group 2 would have an expectation of two collisions per million miles, and so on.

According to certain aspects, scoring and grouping may be defined in such a way that there will be interpretable and coachable factors. That is, a driver's summary score may be determine to which Risk Group the driver will be assigned. The components of that summary score will each relate to one type of driving scenario (such as traffic light behavior in a traffic light scenario or speeding behavior in an open-road scenario). In this way, individual factors may have a sensible correlation with collision risk. As will be described, summary score factors will have negative correlation between compliance and collision risk, such that higher compliance correlates with lower collision risk.

Taken together, a person with a low score would know not only that they have a high collision risk, but they should also know which driving behaviors are most problematic for them, and with that information the driver can be more effectively coached. Furthermore, because the different risk groups are defined in terms of the summary score, the driver can quickly understand how a change in driving behavior in one or two (or more) specific driving scenarios can move the driver from one group to another. This property of coachable risk groups then makes it easy to understand how focusing on driving behavior in one or two (or more) specific driving scenarios will reduce the likelihood that the driver will get into a collision and by how much.

Figure 7:
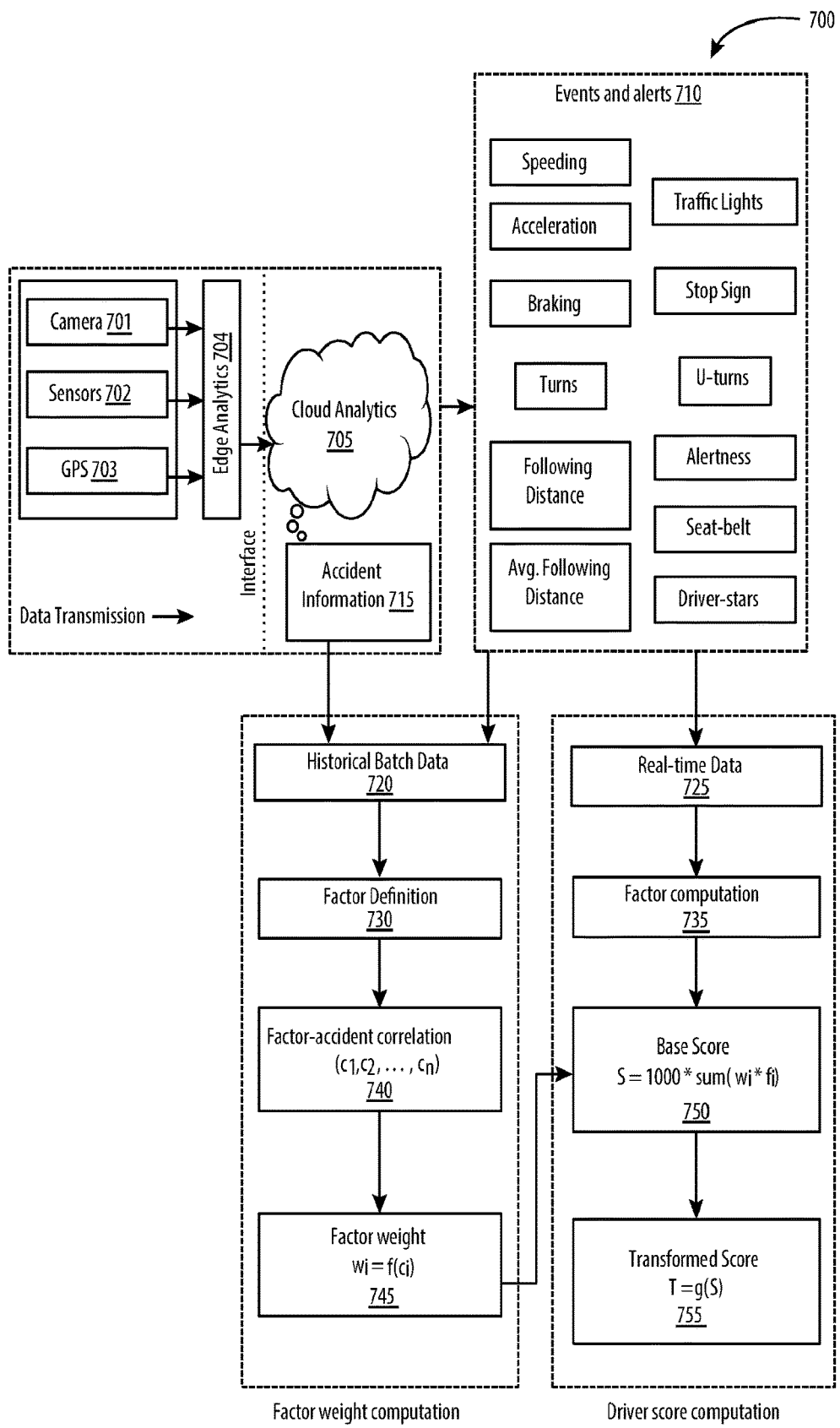
FIG. 7 illustrates an example of allocating drivers into coachable driver risk groups in accordance with certain aspects of the present disclosure.

FIG. 7 illustrates a data flow diagram 700 that supports a determination of coachable risk groups. Data may be captured by a device (e.g., the device 100 of FIG. 1) through a camera 701 (e.g., the cameras 102 or 104 of FIG. 1), inertial sensors 702 (e.g., the inertial sensors 106 of FIG. 1), or the GPS 703 (e.g., the GPS 112 of FIG. 1) then processed using an edge analytics engine, which may be executed on one or more processors (e.g., the SOC 110 of FIG. 1) of the device. Data inferences, metadata, and indications of detected driving events and alerts may be transmitted to a cloud analytics 705 server (sometimes referred to herein as the "cloud server 705") via one or more communications interfaces (e.g., via an LTE interfaces such as the LTE interface 116). A cloud server 705 may maintain a database of driving events and alerts 710. The events and alerts 710 can include, for example, indications of speeding events, indications of acceleration events, indications of braking events (e.g., hard braking events, etc.), indications of average following distance, indications of following distance violations (e.g., following distance falling below a threshold), indications of driving events at traffic lights, indications of driving events at stop signs, indications of turns, indications of U-turns, indications of driver alertness, indications, of seat-belt use, and indications of driver-stars. The events and alerts 710 may be broadly classified into various types representing different aspects of driving behavior corresponding to different driving scenarios.

Continuing with the illustration, a factor weight computation may be performed by the cloud server 705. Based on a historical distribution of captured events and alerts (shown as the historical batch data 720), multiple factors 730 may be defined to quantify different types of traffic compliance or non-compliance. Each factor may be a monotonic function of similar events and alerts in a given driving scenario (e.g., "full stop" stop sign events and "no stop" stop sign events may be compared to determine a single factor). The factors may be scaled so that their values range between 0 to 1 where 0 may correspond to maximum noncompliance and 1 may correspond to minimum non-compliance for the driver's driving behavior in that driving scenario.

In other words, a factor may be defined in a manner that may ensure that a particular factor has a negative correlation with accident probability. This negative correlation supports the goal of "coachable driving risk groups." For driving behaviors that are analyzed into a factor such that the factor exhibits a negative correlation with collision risk, a driver may be encouraged to address unsafe driving habits because he knows that modifying his behavior so that his score for that factor is increased will lead to a decrease in collision risk. The definition of factors to exhibit a negative correlation with collision risk may be referred to as the factor-accident correlation 740. Because all of the factors are defined along a compliance/non-compliance axis, this ensures that the driving scenarios will be identified for which greater compliance entails lower collision risk.

In some embodiments, for each factor 730, a search space is defined with different parameter configurations of some standard functions (e.g., tan h, sigmoid). Factor-accident correlations 740 are computed for all configurations and the configuration with the highest negative correlation is selected. Once all the factors are defined and factor-accident correlations 740 are computed, weights 745 may be assigned to each factor. A factor weight 745 is defined as a monotonic function of factor-accident correlation 740 where the highest weight is assigned to the factor of the analyzed configuration with the maximum negative correlation with accident probability. Optionally, weights of positively correlated factors 730 may be ignored or set to negligible weight values. In some embodiments, the factor weights 745 may be normalized so that the sum of all factor weights 745 may be 1.

In some embodiments, the subset of factors 730 which are negatively correlated to accidents are included in a summary score and the remaining factors 730 are ignored. For some embodiments, negative weights 745 will not be allowed. Such a rule may be preferable, for example, if each factor 730 definition is interpretable as a driving compliance/non-compliance factor 730, and there is a desire that an enabled safety system does not encourage non-compliance behaviors. The factor weights 745 for factors that are negatively correlated with accidents may be used in connection with real-time data 725 gathered from a device (e.g., a device 100) within a vehicle as the vehicle is operated by a driver to calculate a base score 750.

To do so, the cloud server 705 may perform a factor computation 735 for each of the factors identified in the real-time data, which may then be applied to corresponding factor weights 745 (which may be calculated from aggregate historical batch data 720 from many drivers). The base score 750 may be calculated, for example, using the following formula:

$$S = 1000 * \sum_i w_i * f_i,$$

Where S is the base score 750, each $f_i$ represents a respective factor computation 735 derived from the real-time data 725, and each $w_i$ represents the respective factor weight 745 for each factor $f_i$. In some implementations, a transformation function (represented here as g(S)) may be applied to the base score 750 to calculate a transformed score 755, represented in FIG. 7 as T. Further details of the calculation of the transformed score are described in greater detail herein.

Figure 8:
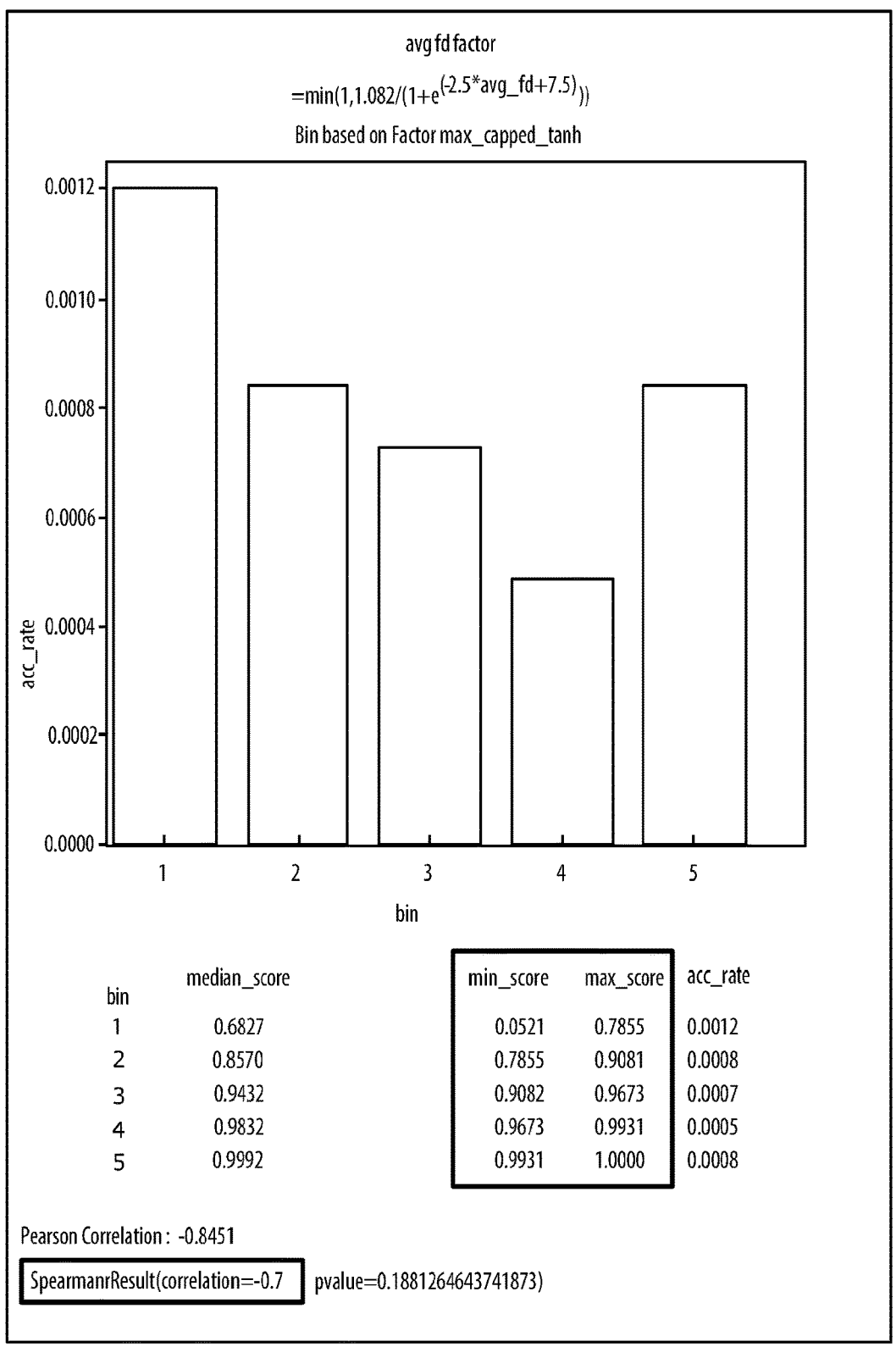
FIG. 8 illustrates an example of allocating drivers into coachable driver risk groups in accordance with certain aspects of the present disclosure.

Certain aspects of the present enclosure have undergone testing using historical driver safety data. Driving factors that have a high negative correlation with accident probability may include, but are not necessarily limited to: average following distance; traffic lights: and driver alertness. FIG. 8 illustrates details of an average following distance factor computation.

Driving factors that have a relatively low negative correlation with accidents may include, but are not necessarily limited to: certain U-turns and acceleration (e.g., a propensity to accelerate unusually quickly). For historical data samples spanning at least six months, no factors were found to exhibit positive correlations with accidents. While some factors have relatively greater impact on collision risk, behaviors with relatively low but non-zero correlations may still contribute to a driver's overall collision risk.

The impact is less for some factors compared to others but cannot be totally ignored. For example, increase of accident risk is higher for a driver with 0.2 alertness factor compared to a driver with 0.2 acceleration factor. At the same time, increase of accident risk is higher for a driver with 0.2 acceleration factor compared to a driver with 0.9 acceleration factor.

Transformed Driver Score Computation

Figure 9:
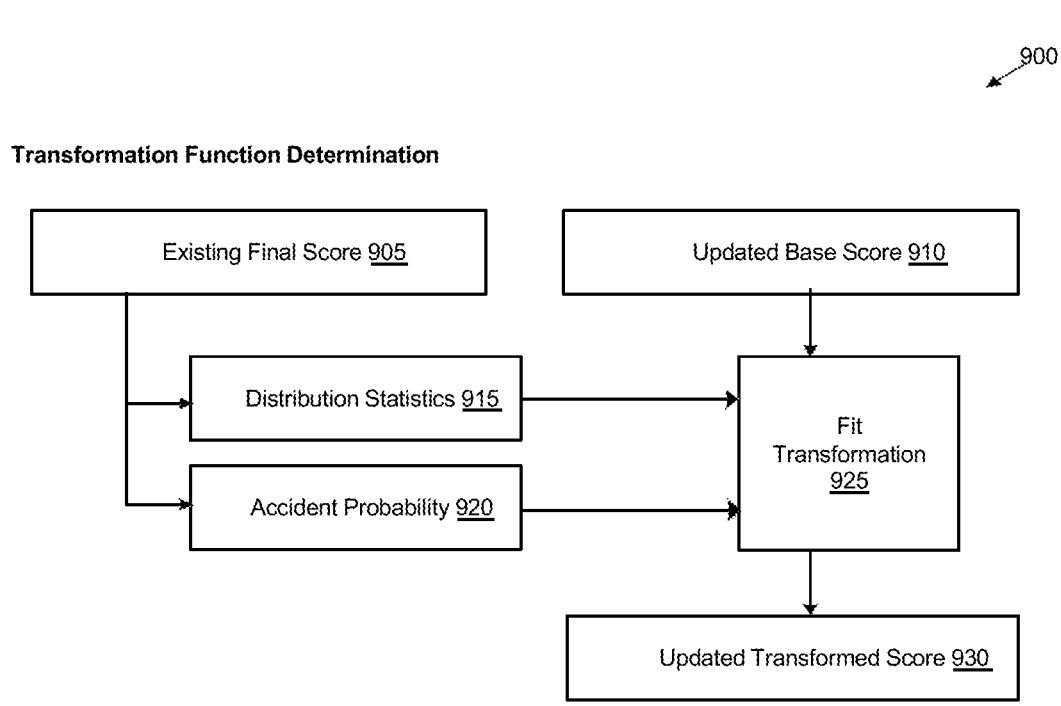
FIG. 9 illustrates an example of allocating drivers into coachable driver risk groups in accordance with certain aspects of the present disclosure.

As illustrated in the flow diagram 900 of FIG. 9, based on factor definitions just described, factor values may be computed in real time for each driver. In case sufficient data is not available to compute a factor, a median of that factor distribution or full factor value is awarded to the driver to give benefit of doubt. Similarly, different data sufficiency criteria are checked for daily, weekly or monthly score computation.

Figure 10:
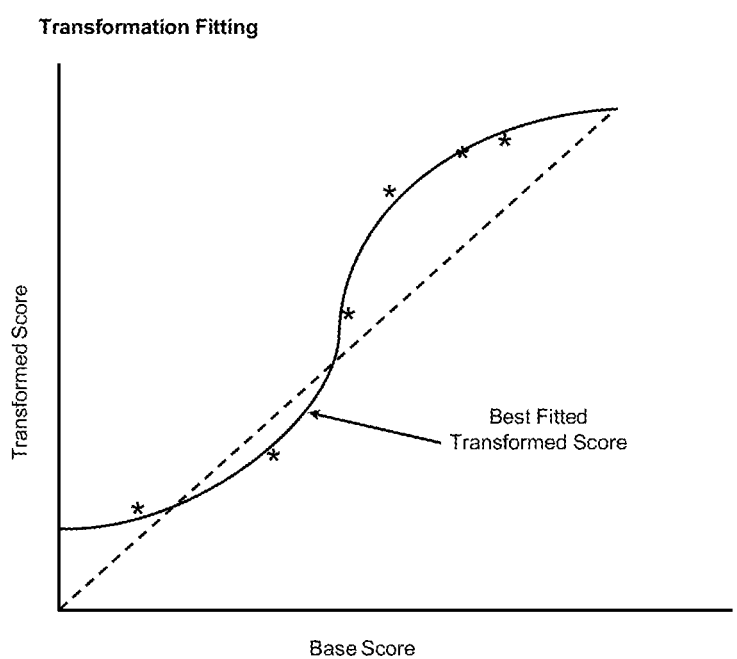
FIG. 10 illustrates an example of allocating drivers into coachable driver risk groups in accordance with certain aspects of the present disclosure.

In some embodiments, driver scoring is done in two steps. First, a base score is computed as weighted sum of all factor values scaled up to the score range (e.g., as shown in FIG. 7). For example, a maximum score range may be 1000. Second, a transformation function is applied on top of the base score to get the final score. The outcome of these two steps is illustrated in FIG. 10. As shown in FIG. 10, a fitting function is utilized to fit a base score to a corresponding transformed score. The transformed score may be stored in memory in association with an identifier of the driver for use in selectively transmitting alerts to a driver in order to change a habitual driving behavior and thereby reduce the driver's overall accident probability. In certain embodiments, selectively transmitting alerts to a driver may by accomplished by enabling certain in-cab real-time feedback alerts, so that the driver's habit-formation and maintenance brain circuits are selectively primed to "chunk" the habitual driving behavior associated with a monitored driving scenario.

In this context, "chunking" of a habitual driving behavior is meant to refer to neurophysiological findings that the striatum sets up boundary markers for chunks of behavior, as described, for example, in the 2014 Scientific American article entitled "Good Habits, Bad Habits" by Ann M. Graybiel and Kyle S. Smith, the contents of which are incorporated herein by reference in its entirety.

Figure 11:
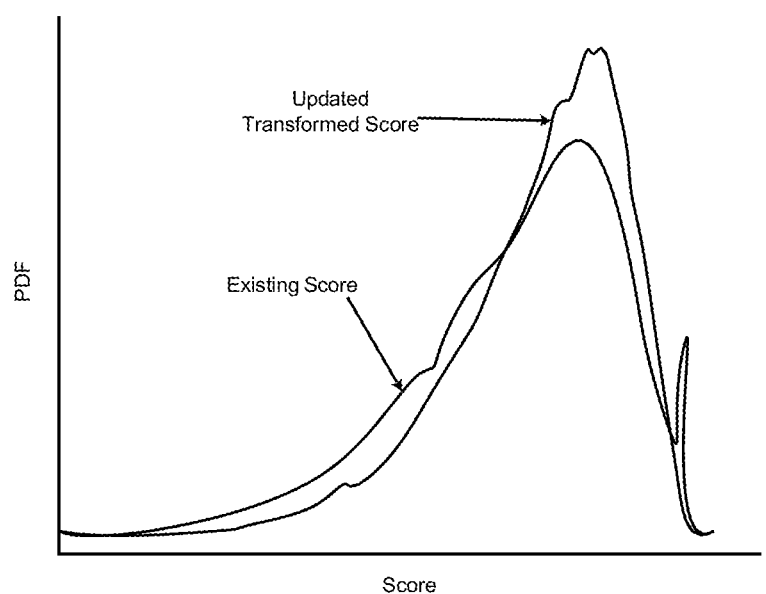
FIG. 11 illustrates an example of allocating drivers into coachable driver risk groups in accordance with certain aspects of the present disclosure.

FIG. 11 illustrates a distribution overlap for Monthly scores (e.g., transformed scores that are computed on a monthly basis for a large number of drivers). The "Existing Score" of FIG. 11 corresponds to the "Base Score" in FIG. 10. The "Updated Transformed Score" in FIG. 11 corresponds to the "Transformed Score" in FIG. 10. As indicated in FIG. 11, the distributions remain comparable. Certain teachings described below were applied to ensure that these distributions remain comparable when computed over different time periods and/or after adjusting the computations of score factors associated with one or more driving scenarios, as this is another desirable property of Transformed scores.

The transformation function may be applied on a daily historical base score of each driver for a specified duration (for example, 6 months) and aggregated (weighted average based on daily drive time) to a single score for each driver. The drivers may then be sorted in ascending order based on the aggregated scores and divided into N equal sized bins having D drivers in each bin. Accident probability is computed by dividing number of accidents in each bin by D. In this example, the group sizes are kept constant which may facilitate the comparison of metrics across different groups.

Each of these groups may be referred to herein as a "driver category" or a "category." Each category can correspond to a likelihood that a particular driver classified into that category will be involved in a driving accident. As a driver improves their driving behaviors, the transformed score for that driver will improve (e.g., correspond to a reduced likelihood that the driver will be involved in a driving accident), and the driver may be sorted into a different, lower-risk category. As described herein, alerts can be selectively transmitted to drivers that fall within certain categories, in an effort to improve the drivers to other, lower-risk categories over time.

These scores may be calculated on a periodic basis (e.g., weekly or monthly). The transformed scores may be computed as a weighted average of transformed daily scores with daily drive time as weights.

Referring again to FIG. 9, illustrated is a flow diagram 900 of a technique whereby an evolving driver safety system may adopt new or modified driving event and alert types. When the safety system feature set changes, a technique such as the one in FIG. 9 may be applied. Accordingly, a transformation may adjust a base score so that summary scores may be comparable before and after the addition to new detectable driving scenarios or the modification of certain driving factors associated with already detectable driving scenarios.

In other words, as factor definition and factor weights are derived based on historical data (events and accidents), a method such as the one illustrated in FIG. 9 may be applied to perform periodic calibration involving the same methodology but with a newer batch of data. The method shown in the flow diagram 900 of FIG. 9 can be applied to generate an updated transformed score 930 using an existing final score 905, an updated base score 910, distribution statistics 915, and accident probabilities 920 for corresponding factors, as input to a fit transformation 925 process. Some factors may be modified when there are changes in underlying input statistics/events/alerts or device capabilities. For example, an average following distance factor may be redefined or modified to incorporate newly introduced traffic congestion statistics. That is, if it is determined that a correlation between following distance and collision risk is more reliable at time of high traffic congestion, then the factor definition of "average following distance" may incorporate this new input as a refinement to the definition of the relevant driving scenario. The process described above may be applied so that driving behaviors exhibit a negative correlation with collision risk. Ultimately, the summary score may be different that it had been previously. Because groups of drivers in an existing Coachable Risk Group have a known collision risk, the transformation function (e.g., the result of the fit transformation 925 process) may ensure that the updated base score still results in Coachable Risk Groups (e.g., driver categories) having the same properties as they did previously (e.g., each category corresponding to a similar respective driving accident probability).

According to certain aspects, the transformation may be defined to be monotonic. Furthermore, for a transformation function g(S), g(max(S))=max(S). This equation indicates that the transformation function is defined such that the maximum transformed score is equal to maximum base score. For example, if the range of base score is 0-1000, the maximum score a driver will be awarded after transformation will also be 1000.

Referring again to FIG. 11, the distribution of existing final scores should overlap with a proposed transformed score. KL Divergence and Cross-Entropy may be used as metrics to measure distributional consistency. In one example, when both of these metrics are below predefined thresholds, the transformation function may be considered satisfactory and the fit transformation 925 process may terminate.

Additional desirable features are also contemplated. As described above, a transformed score should have a high negative correlation with accident probability, which means if we divide all drivers in N score groups based on their average score during a given period, a driver improving his driving performance and moving from a lower score group to higher score group should have a reduced probability of accident.

To fit the transformation function, a map of base score versus desired transformed score is created, as illustrated in FIG. 10. In some embodiments, the best-fitted curve satisfying all (or substantially all) of the considerations just described is selected as a transformation function. Similar to the determination of factor definitions, first, a search space is defined with different parameter configurations of some standard functions (e.g., tan h, sigmoid). Then, a subset of the standard functions is shortlisted, which satisfy the negative correlation condition. For each driver, all shortlisted transformed scores are aggregated and binned into multiple score groups (or categories). A correlation between accident probability and the mean/median of each score group is computed, and a transformation function resulting into maximum negative correlation is finally selected.

Certain fleet operators, based on their internal policy or type of operation, may customize weights for different driving event factors. To enable customized weights for different driving event factors, the proposed driver scoring mechanism can include a weight multiplier ($y_i$) for every factor $f_i$, such that the updated base score becomes:

$$1000 * \frac{\sum_i y_i * f_i * w_i}{\sum_i y_i * w_i}$$

In this case, a fleet operator-defined driver score may be compared with system-defined driver score to check which is having better correlation with accident probability. Adjustments to the weight multipliers $y_i$ may be made in accordance with this comparison.

Figure 12:
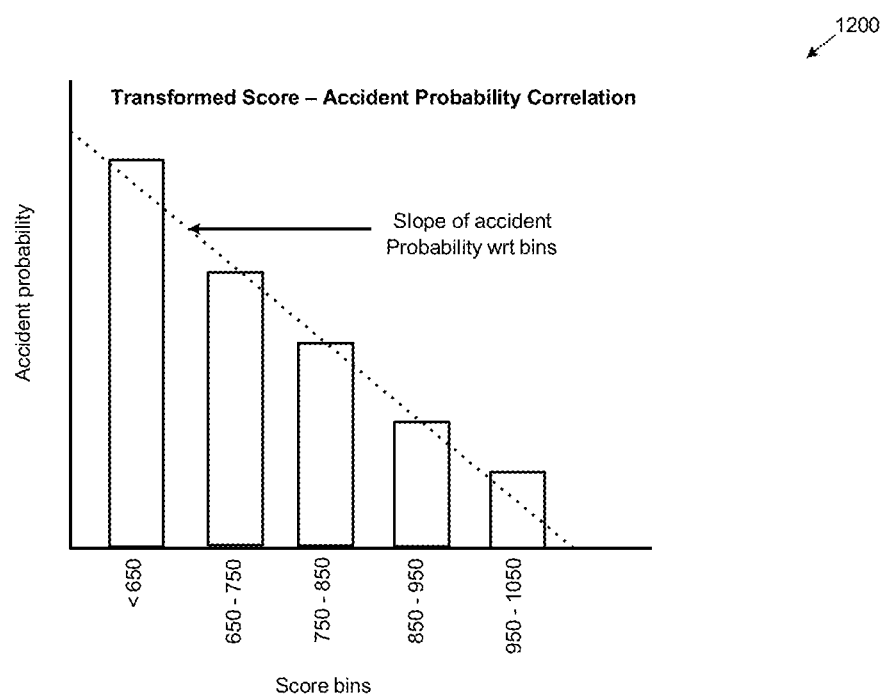
FIG. 12 illustrates an example of allocating drivers into coachable driver risk groups in accordance with certain aspects of the present disclosure.

An example of the relationship between a calculated transformed score for many drivers and accident probability is illustrated in FIG. 12 in the graph 1200. As shown in the graph 1200, drivers are categorized into five groups: one group of drivers having transformed scores that are less than 650, a second group of drivers having transformed scores that are within a range of 650 to 750, a third group of drivers having transformed scores that are within a range of 750 to 850, a fourth group of drivers having transformed scores that are within a range of 850 to 950, and a fifth group of drivers having transformed scores that are within a range of 950 to 1050. It should be understood that, although only five groups are shown here, any number of groups or categories may be created from distributions of transformed scores, and that each group may correspond to any range of transformed score values. The graph 1200 shows the inverse relationship between transformed score and accident probability, with the drivers having transformed scores of less than 650 having the highest accident probability, and the drivers having transformed scores in the range of 950 to 1050 having the lowest accident probability.

Figure 13:
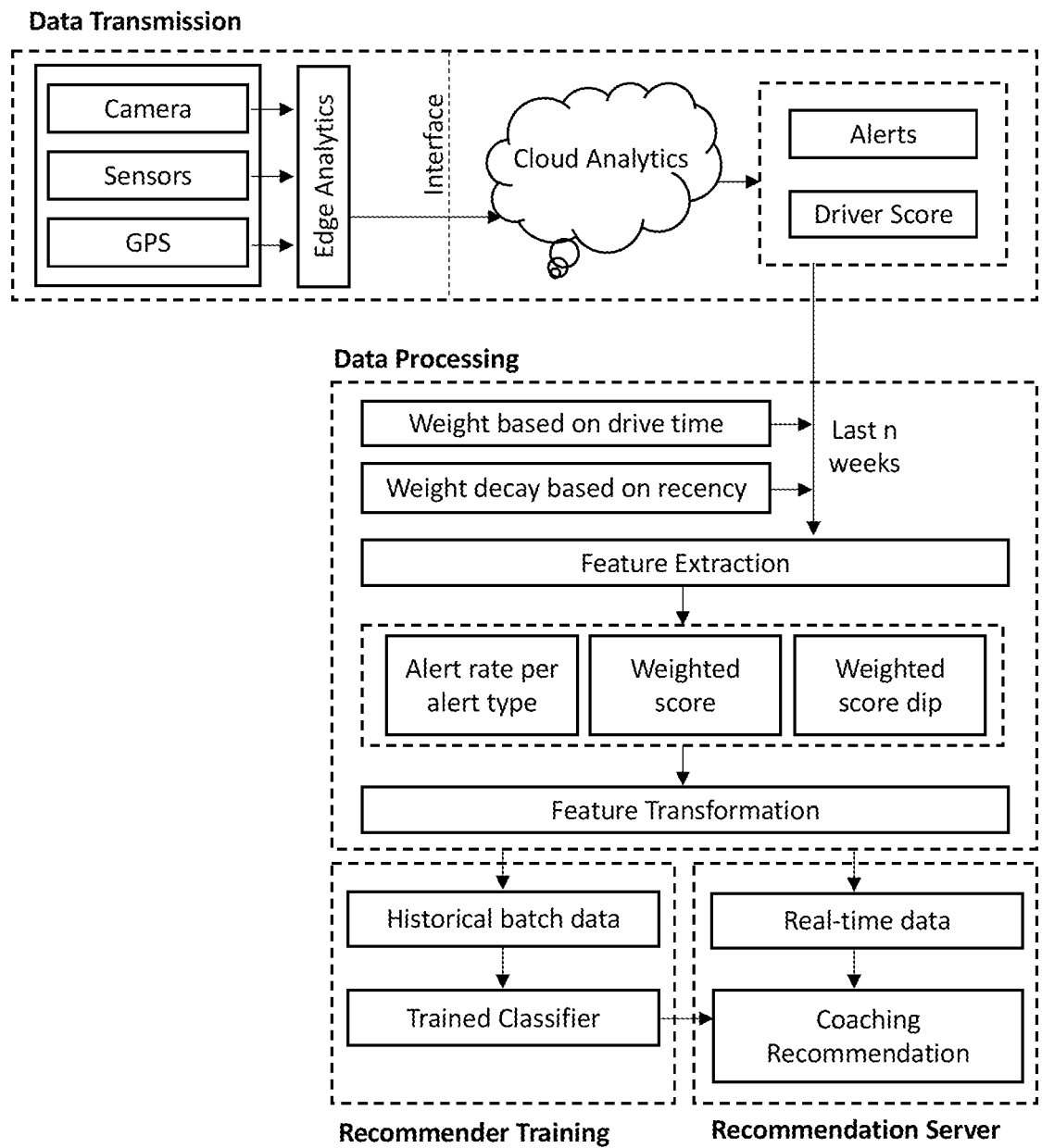
FIG. 13 illustrates an example of allocating drivers into coachable driver risk groups in accordance with certain aspects of the present disclosure

Referring to FIG. 13, certain aspects of the present disclosure may be applied to a recommendation server function which determines which drivers should be coached. Data captured through camera 1301 and inertial sensors 1302 (e.g., the cameras 102 and inertial sensors 106 of the device 100 in FIG. 1) and metadata (e.g., GPS location from the GPS sensors 1303, etc.) can be processed using an edge analytics engine 1304 (e.g., the SOC 110 of the device 100 in FIG. 1). Detected driving events and alerts 1306 (e.g., the driving events and alerts 710 described in connection with FIG. 7) are transmitted to a cloud server (shown here as the cloud analytics 1305 server, which is sometimes referred to herein as the "cloud server 1305"). The cloud server 1305 may calculate a driver score 1308 (which may include calculating a base score and a transformed score), which may be stored in association with an identifier of a corresponding driver.

For some embodiments, to determine which drivers are candidates for further coaching, the cloud server 1305 may determine a weekly aggregated count of each alert 1306 type and the weekly driver scores 1308 of the past N weeks (e.g., where N is a predetermined value, etc.), and provide these values to a driver recommendation system. The driver recommendation system may be executed by the cloud server 1305, which may include one or more servers or data processing systems. In a data processing step, the driver recommendation system can summarize the past N weeks of information fed in the form of multiple features, such that for each feature, weight values can be determined such that more weight is given (e.g., corresponding weight values are greater than weight values for other features) to recent weeks' information 1312 and weeks with higher drive time 1310. In a feature extraction step 1314, features may be selected in a way to detect gradual dips in driving performance as well as central tendency of driving performance. In addition, the feature extraction process can be used to determine the overall alert rate per alert type 1316, a weighted score 1318 for the driver, and an amount of weighted score dip 1320.

In one example, the dip in driver score (shown as the weighted score dip 1320) can be computed using the following equation:

$$\frac{\sum_{w=1}^{5}\left((GZscore_w - GZscore_{w+1}) * \sqrt{mm_w * mm_{w+1}} * (1-\text{decay})^w\right)}{\sum_{w=1}^{5}\left(\sqrt{mm_w * mm_{w+1}} * (1-\text{decay})^w\right)},$$

where w denotes how old the data is (in weeks), and $mm_w$ denotes the number of monitored minutes (minutes driven). Although this formula is shown as being calculated using data gathered over a period of six weeks, it should be understood that the foregoing formula may be modified to calculate the change in driver score over any time period. The default decay value is 0.2, which means if the weight of the current week's metric is 1, for last week it will be 0.8, for 2 weeks old metric it will be 0.64 and so on. Finally, features are scaled/normalized/transformed. The scaled, normalized, and transformed scores may yield the output of a coaching recommender model.

The cloud server 1305 may execute a recommender training process for a classifier 1326 using a historical batch data 1324. Recommender training may include a classifier 1326 trained using historical batch data 1324 with worst performing drivers in each feature category labelled as coachable driver. The trained classifier 1326 can be any type of classification model that may be trained using supervised, unsupervised, or semi-supervised machine learning techniques. Some non-limiting examples of trained classifiers may include Naïve Bayes classifiers, logistic regression classifiers, neural networks (e.g., fully connected networks, recurrent neural networks, convolutional neural networks, combinations thereof, etc.), sparse vector machine (SVM) classifiers, random forest classifiers, and decision tree classifiers, among others. The historical batch data 1324, on which the classifier 1326 is trained, can include sets of driver scores across multiple categories that are each associated with respective ground truth data indicating whether that driver was "coachable" or "uncoachable." The cloud server 1305 can train the classifier 1326 using any type of machine learning technique, including supervised backpropagation techniques, unsupervised clustering techniques, or semi-supervised techniques. Coachable drivers are drivers that showed an improvement to driving behavior in response to coaching. As such, the classifier 1326 can be trained to receive real-time driving data 1328 as input, and generate a coaching recommendation 1330 when executed over the real-time driving data 1328.

A trained classifier 1326 may be preferable to a coaching recommendation system that involves selecting the lowest scoring drivers on a per-feature basis. Firstly, while serving a recommendation, information of one driver is processed at a time, and used to determine whether the driver needs coaching or not. For a particular week, in real time, it is difficult to manually determine feature-wise ranks of a driver, whereas, the output of the classifier 1326 is independent of all other driver feature information.

Second, a coaching recommendation system may be more effective if it considers the combined effect of multiple features on driver coachability rather than evaluating each feature in silos. For example, the trained classifier 1326 can identify drivers who are at risk across multiple dimensions, but that might not belong to a lower scoring percentage of drivers on any single dimension.

In some embodiments, the trained classifier 1326 is executed periodically by the cloud server 1305 system (e.g., once every week), and safety managers are served a list of coachable drivers along with their coachability scores. The coaching recommendations generated by the cloud analytics server 1305 can be transmitted to and presented by a computing device of a safety manager (not pictured). The coaching recommendations 1330, as well as any of the other information accessed or computed by the cloud server 1305 system, can be provided to a safety manager computing device in response to a corresponding request.

Combining the driver's score and specific behavior trends when prioritizing driver coaching may facilitate a balanced selection of drivers with greatest overall risk, as well as specific risk related to certain behaviors in certain driving scenarios. When only focusing on a driver's summary score, it is possible for a driver to have a high number of alerts for a certain driving scenario, yet not drop below a configured composite/summary score threshold. For example, a driver with a high overall score may habitually commit a policy violation, such as making an unauthorized U-turn. Therefore, a fleet may choose to incorporate both procedures, so that these types of isolated aspects of driving risk may be addressed. Likewise, reference to individual component scores may enable positive recognition of certain areas where an otherwise underperforming driver is performing well.

Another safety compliance concern may be seatbelt compliance. Seatbelt compliance may be a driving behavior for which a percentage of time spent driving while not wearing a seatbelt is a more relevant metric than individual observations of not wearing a seatbelt. Accordingly, a virtual safety manager (which may be executed by the cloud server 1305 system described in connection with FIG. 13) may select drivers for coaching based on seatbelt compliance. In some embodiments, the virtual safety manager may augment a selection of drivers based on a separate consideration of seatbelt compliance. For seatbelts, it may be more effective to coach drivers specifically on seatbelt compliance behavior without reference to their overall driving risk. This approach may be based on the relatively low cost of delivering feedback to the driver about low seatbelt compliance statistics. Coaching drivers can include selectively transmitting alerts to drivers to reduce occurrences of particular driving behaviors. Reducing occurrences of behavioral patterns that are correlated with accident risk can reduce the overall rate of accident risk of a driver over time.

Additional compliance statistics may form the basis of targeted coaching campaigns. Selection of drivers for coaching based on percentage of complete stops at railroads, for example, may be incorporated into a virtual safety manager configuration for fleets that include school buses or that ship hazardous materials. This information can be incorporated into the foregoing equations as additional weighting factors, or by adjusting existing factor weights, for drivers in those driving fleets. Such fleets may be required to come to complete stops at all railroad signs. In this way, a virtual safety manager may select drivers who are not consistently observing a complete stop policy near railroad signs. As with seatbelt compliance, communication of this type of coaching may be performed with relatively low costs. In addition, alerts may be selectively transmitted to drivers automatically near to the time that the driver encounters the driving scenario and violates the policy (or violates the policy at or greater than a certain frequency, etc.), as described in greater detail herein.

In some embodiments, a virtual safety manager may select drivers for coaching in a semi-reactive manner. For example, the virtual safety manager may flag drivers who exhibit an unusually low or high, or sudden change, of a composite driving score on a particular day. In some embodiments, this may correspond to determining and sorting driving scores on a relatively short time interval, such as hourly. Accordingly, drivers that are trending downward may be identified. These drivers may then be flagged to determine if the safety team should intervene with the driver during the same day. Likewise, a virtual safety manager could alert the driver that he or she is currently exhibiting a high score for the day, and thus introduce an aspect of gamification. For interventions that include a human manager making a call or sending a message, a virtual safety manager may throttle such notifications based on available manager bandwidth.

In some embodiments, a virtual safety manager may select drivers for coaching based on metrics that are calculated over a timescale that may be considered longer than a typically predictive selection of which drivers to coach. A driver selection module of a virtual safety manager may incorporate lifetime learning metrics. Such metrics may include metrics reflective of the opportunity for habitual change. A determination that the driver's performance has slowly declined, for example, may indicate that the driver is slowly forming an unsafe driving habit. Accordingly, a virtual safety manager may attempt to schedule a coaching session at a time that is early in this negative habit formation, when the behavior may be more malleable (see "Good Habits, Bad Habits" referenced above). In addition, a virtual safety manager may transmit alerts to a driver when unsafe or complementary safe driving behaviors for a particular driving scenario are detected, as described in detail herein.

Similarly, a driver's safety metrics (e.g., score trends over predetermined periods of time) may reflect that a driver is in a positive trajectory of habit formation and solidification. Selection of a driver for coaching may be based, therefore, on whether they are in a training period. Each driver may have a six month ramp up time during which they are being actively instructed on new habits associated with commercial truck driving. At such a time period, the driver may be expected to be more receptive to additional coaching to solidify safe behavior. Furthermore, outside of such time periods, meaning at times that the driver is not expected to be receptive to traditional coaching, automated and selective transmission of alerts may be more effective, as described below.

Given the long timescales of habit formation and modification, it is desirable that a driver's score stays comparable over time (assuming that the driver's safety profile has not changed). As, for example, the IDMS improves and offers a more and more refined view into driving behavior, changes to a driver's score should reflect changes to the driver's driving habits and not simply changes to details of a scoring mechanism. Accordingly certain aspects are directed to transforming a first scoring mechanism to a second scoring mechanism so that results may be compared, as described above.

Selectively Transmitting Alerts Based on Monitored Driving Behaviors

In addition to selecting drivers in fleets for coaching sessions based on monitored driving events, the systems and methods described herein can selectively transmit alerts to drivers as the drivers operate vehicles. The alerts can be transmitted to drivers upon detecting that a driver is engaging in an unsafe driving behavior, for example, as a technique for automatic coaching. As alluded to above, such timely feedback may target physiological circuits of habit formation, maintenance, and change, and thereby produce a technical effect of avoiding malfunctions by a human-driven vehicle that could lead to road traffic collisions.

A vehicle operated by a driver may include both a monitoring device, such as the device 100 described in connection with FIG. 1, and an alert device, which may provide auditory or visual alerts when an alert message is received from a remote server or when an alert message is generated based on a local processor based on a detected driving behavior in an identified driving scenario. The systems and methods described herein can both select which drivers to which to transmit alerts, and select which unsafe driving behaviors should be corrected for particular drivers. The selectively transmitted alerts guide the driver to operate the vehicle in a way which reduces the occurrence of the driver putting the vehicle in an unsafe condition, in particular when the alerts are transmitted during operation of the vehicle and close in time to a detected occurrence of the unsafe condition. Timely alerts transmitted during operation of the vehicle, for example, in response to detection of driving events which are associated with a monitored driving scenario, can provide immediate feedback to the driver regarding a habitual driving behavior. Over time, by physiologically priming physiological circuits, such timely alerts can teach the driver to reduce unsafe driving behaviors and increase safe driving behaviors. In doing so, the systems and methods described herein can improve a driver's overall driver score by providing immediate feedback regarding identified driving behaviors of concern ("habitual driving behaviors") and encouraging safer driving behaviors, thereby reducing a driver's overall risk of being in a driving accident.

As described by Graybiel and Smith (referenced above), as a behavior is repeated, "it becomes laid down in special habit circuits involving the brain's striatum. The circuits treat the habit as a single 'chunk,' or unit, of automatic activity." Describing a classic T-maze experiment, the authors describe the evolution of habit formation, "as their behavior became more habitual, neuronal activity began to pile up at the beginning and end of the runs and quieted down during most of the time in between. It was as though the entire behavior had become packaged, with the striatal cells [neurons in the striatum] noting the beginning and end of each run." The authors then posit that "the striatum sets up boundary markers for chunks of behavior-habits . . . the striatum essentially helps us combine a sequence of actions into a single unit. You see the candy dish, and you automatically reach for it, take a treat and eat it 'without thinking.'"

While these neurophysiological changes were observed in a laboratory setting, the authors note that habitual behaviors are common to human experience. Familiar habits include brushing one's teeth or driving a familiar route. The authors further note the importance of "after the fact" reward-prediction error signals (which would be timed near the striatal boundary marker corresponding to the end of a habit sequence) as a mechanism for the addition a positive or negative weight to a particular course of action.

Based on these insights, certain aspects of the present disclosure aim to provide a positive or negative weighting (depending on the valence of timely feedback) to these habit circuits. A habitual driving behavior is the way in which the driver usually behaves in a particular driving scenario. A habitual driving behavior may be considered a single unit of behavior that is itself comprised of a sequence of behaviors. A habitual driving behavior of rolling through stop signs may be comprised, for example, of visually perceiving the stop sign, initiating a braking at an appropriate time, checking for cross traffic, releasing the brake (prior to coming to a complete stop), and then accelerating. By delivering timely reinforcement soon after the detection of the completed habitual driving behavior, the reinforcement is temporally in position to influence the striatal representation of the end boundary of that behavior. By doing so, boundary markers associated with a complex unit of the driving habit may be weakened. Likewise, after detecting that the same driver did come to a complete stop, a transmission of a different signal (corresponding to positive feedback) or the absence of the first type of transmitted signal may serve to weight this new behavioral sequence. Over time, the new behavioral sequence may become the dominant driving habit. In this way, the driver may gradually shift the frequency of unsafe driving acts, which in turn, based on historical driving data, is known to lessen the likelihood of road collisions.

Providing alerts to drivers while a driver is operating a vehicle can be advantageous over manual coaching sessions. In particular, it can alert a driver to a driving behavior as it occurs, which can provide for real-time feedback of driving behaviors that may be performed unconsciously. As described just above, this can interrupt otherwise harmful or unsafe behavioral patterns, and cause more direct and immediate change than manual coaching, which is often performed much later (and beyond the physiological window) and in an environment that is different from an average driving environment. By delivering the feedback in a different environment, the striatal circuits that are encoding the habitual driving behavior are unlikely to be activated and therefore the coaching may be less effective. In addition, the response to the alerts can be monitored directly over time to determine the overall improvement of drivers in response to automatic coaching. Records of alerts that are transmitted to drivers can be stored, for example, in a database, and later retrieved to analyze the performance and occurrence of potentially dangerous driving behaviors, and driving behavior patterns, over periods of time.

Figure 14:
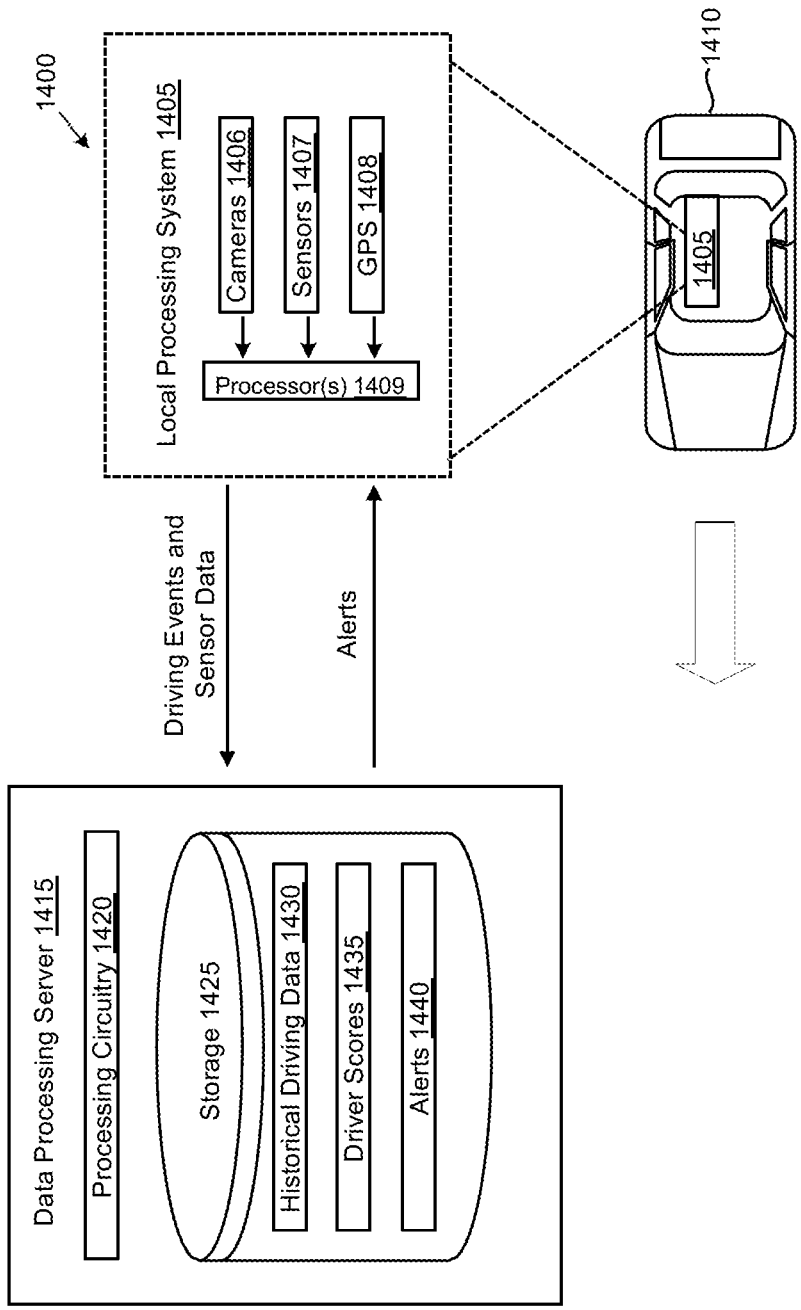
FIG. 14 illustrates an example system for selectively transmitting alerts based on monitored behavior of a driver in accordance with certain aspects of the present disclosure.

FIG. 14 illustrates a system 1400 for selectively transmitting alerts based on monitored behavior of a driver. The system 1400 can include a vehicle 1410, which may be integrated with a local processing system 1405. The local processing system 1405 can communicate with a data processing server 1415, which can perform, for example, any of the operations described herein corresponding to a virtual safety manager. The local processing system 1405 can include one or more processors 1409, one or more cameras 1406, one or more sensors 1407, and a GPS receiver 1408. Each of the cameras 1406, the sensors 1407, and the GPS receiver 1408 can be in communication with the processors 1409. The local processing system 1405 can include a communications interface (not pictured), which may be used to wirelessly communicate information to and from the data processing server 1415. The local processing system 1405 can include an alert device, such as an alarm or warning light, which can activate in response to alert messages received from the data processing server 1415.

The data processing server 1415 can include processing circuitry 1420, and include a storage 1425. The storage 1425 can store historical driving data 1430 from a number of vehicles or drivers, driver scores 1435 for each driver that is monitored by the data processing server 1415, and record of alerts that are transmitted to the vehicle 1410 for each driver that is monitored by the data processing server 1415. The data processing server 1415 can receive information from the local processing system 1405, for example, via a wireless communications interface. The information received from the local processing system 1405 can include detected driving events, sensor data, video data, audio data, GPS location information, and any other information generated by the local processing system 1405.

The vehicle 1410 can be any type of vehicle, such as a car, truck, sport-utility-vehicle (SUV), motorcycle, semi-tractor trailer, or other vehicle that can operated by a driver. In some implementations, the vehicle 1410 can include an autonomous vehicle control system (not pictured) can that navigate the vehicle 1410 or provide navigation assistance to a driver of the vehicle 1410. As the vehicle 1410 is operated, the vehicle 1410 may encounter various road features, including stop signs, other vehicles, traffic lights, turns, intersections, unexpected obstacles, or other features to which the driver (or autonomous vehicle control system) must react.

The vehicle 1410 can include a local processing system 1405, which may be, or may include any of the structure or functionality of, the device 100 described herein in connection with FIGS. 1 and 2. The local processing system 105 can include one or more processor(s) 1409. The processor(s) 1409 can include at least one processor and a memory, (e.g., a processing circuit, etc.). The memory (e.g., a storage device, other computer memory, etc.) can store processor-executable instructions that, when executed by a processor, cause the processor to perform one or more of the operations described herein. The processor(s) 1409 may include a microprocessor, an application-specific integrated circuit (ASIC), a field-programmable gate array (FPGA), a graphical processing unit (GPU), etc., or combinations thereof. The memory may include, but is not limited to, electronic, optical, magnetic, or any other storage or transmission device capable of providing the processor with program instructions. The instructions may include code from any suitable computer programming language.

The local processing system 1405 can further include one or more cameras 1406, which may be any type of capture device. One or more of the cameras 1406 may be video cameras capable of producing a video stream or a sequence of timestamped images. The cameras 1406 may capture images, or frames of video, at predetermined intervals, and can store the frames or images in memory for processing by the processor(s) 1409. The cameras 1406 may be mounted in or on the vehicle 1410 such that various views of both the driver, and the area in front of the vehicle 1410, may be captured. For example, one or more of the cameras 1406 can be positioned on or near the windshield of the vehicle such that the camera 1406 can capture images or video of the environment in front of the vehicle. For example, when the vehicle 1410 is operated by a driver, the cameras 1406 can capture images or video that depicts the roadway in front of the vehicle, which may include any type of road feature, such as an intersection, stop sign, stop light, another vehicle, other information, etc. In addition, one or more of the cameras 1406 may be positioned to capture images or video of the driver operating the vehicle 1410, for example, to monitor the attentiveness of the driver or to monitor responses taken by the driver in response to alerts or other events. In some implementations, one or more of the cameras 1406 may be integrated into the vehicle (e.g., into a front bumper) or may be an aftermarket component (e.g., affixed to a windshield or dashboard).

The images or video captured by the cameras 1406 may be stored in a memory that is coupled to the processor(s) 1409, such that the processor(s) 1409 may perform image or video analysis to detect various driving events. In some implementations, the processor(s) 1409 can communicate the images or video to the data processing server 1415 for further analysis. The images or video can be stored as any sort of image or video file, or can form a part of an image stream of any suitable codec or format. The images or video may be stored in association with an identifier of the camera 1406 from which the video or images were captured, and in some implementations, in association with an identifier of the driver that is operating the vehicle 1410.

The cameras 1406 can capture images or video that can include pixels that include color data and location data that identifies the color and location of the pixel in the image or video. In some implementations, the cameras 1406 can capture the images or video in one or more different color channels (e.g., each channel corresponding to a particular color wavelength). In some implementations, one or more of the cameras 1406 can capture non-visible light (e.g., infrared light, etc.). Each color channel in a pixel of an image or video captured by the cameras 1406 can identify the intensity of a particular color of the pixel. These color intensity values can be used in processing algorithms executed by the processors 1409 to detect various driving events. Some processing algorithms may include executing artificial intelligence models to detect or classify features in images or video captured by the cameras 1406

The local processing system 1405 can include the sensors 1407, which may be any type of inertial or movement sensor. The sensors 1407 can include, for example, one or more accelerometers, one or more gyroscopes, one or more magnetometers, or all-in-one devices such as inertial measurement units (IMUs). In some implementations, the sensors 1407 may be part of the vehicle, and may provide diagnostic information about the operational status of the vehicle via a communications bus, such as a CAN bus. The sensors 1407 can include brake sensors, which may indicate a timing and intensity of when a driver uses the brake in the vehicle. The sensors 1407 can include collision sensors that can record a time and intensity of a collision experienced by the vehicle 1410. The sensors 1407 may include light detection and ranging (LiDAR) sensors, which may indicate the distance of the vehicle 1410 to other vehicles or obstacles in a roadway in front of the vehicle 1410.

The sensors 1407 may include a seatbelt sensor, which indicates whether the driver has engaged their seatbelt while operating the vehicle 1410. The sensors 1407 may include odometry information, which may indicate patterns or intensity of acceleration performed by a driver in the vehicle. The sensors 1407 may indicate other signals, such as whether the vehicle 1410 is turning, whether the vehicle 1410 has a turning indicator activated, an amount of time the vehicle has been operated by the driver in a single session (e.g., without turning the vehicle off), rapid acceleration events, rapid braking events, vehicle diagnostic information, or other vehicle information. The processor(s) 1409 may receive the information produced by the sensors 1407 and store the information in memory for further processing (e.g., to detect various driving events, etc.). In some implementations, the information captured by the sensors 1407 may be transmitted to the data processing server 1415, for example, in response to a corresponding request.

In addition, the local processing system 1405 can include a GPS receiver 1408, which may communicate with GPS satellites to generate a signal that indicates an absolute global position of the vehicle. The vehicle position may be updated by the GPS receiver 1408 periodically, and stored in a memory that is accessible by the processor(s) 1409. In some implementations, the GPS receiver 1408 can track the position of the vehicle 1410 over time, such that a driving route of the vehicle can be determined and associated with a driver of the vehicle. The GPS receiver 1408 can further calculate an average speed of the vehicle over time. The driving route of the vehicle can be stored in memory or transmitted to the data processing server 1415.

The processor(s) 1409 may perform analytical processes as the vehicle 1410 is operated by a driver to detect one or more driving events that are associated with driving behaviors. Some examples of these driving events, which in some cases may indicate unsafe or coachable driving behavior, may include speeding, rapid or sudden acceleration, rapid or sudden braking (a "hard" braking event), rapid or sudden turns, turns at unsafe speeds, U-turns, or other driving information. The processor(s) 1409 may receive information from the sensors 1407 that indicate whether the driver is operating the vehicle 1410 while wearing a seatbelt. The processor(s) 1409 can detect such events by monitoring measurements captured by the sensors 1407. For example, sensors 1407 integrated in the vehicle may communicate occurrences of hard braking events, or sudden or rapid acceleration by a vehicle operator. Likewise, the processor(s) 1409 can detect the speed of the vehicle (e.g., from a speedometer sensor) while the vehicle is driving to determine whether a turn was performed at an unsafe speed. The processor(s) 1409 can utilize GPS location data as well as data from the sensors 1407 that indicate that the driver has performed a tight turn to detect occurrences of U-turn events.

In addition, the processor(s) 1409 may correlate information from the sensors 1407 with obstacles or features detected or classified in the images or video captured by the cameras 1407 to detect complex driving events. Some non-limiting examples of such driving events can include a detected following distance of the vehicle 1410 from other vehicles, an overall alertness or attentiveness of the driver, a behavior of the driver at stop lights, stop signs, or intersections (e.g., whether the driver has completely stopped the vehicle at a red light, whether the driver has legally navigated the vehicle 1410 through an intersection).

To detect a driver's behavior at intersections, the processor(s) 1409 may execute one or more object detection or object classification models over the images of video captured by the cameras 1406 to identify features in a roadway. The object detection or object classification models may be trained artificial intelligence models, such as convolutional neural networks that are trained in an offline process using training data that depicts roadways that include intersections. The artificial intelligence models can include any number of layers, such as fully connected layers, convolutional layers, activation layers, softmax layers, or other types of neural network layers. The processor(s) 1409 can execute the artificial intelligence models over the images or video captured by the cameras 1406 by propagating the images or video through each layer of the artificial models until one or more output values are generated. The output values can indicate, for example, whether the vehicle is approaching an intersection, whether the vehicle is within an intersection, or whether no intersection is detected. The artificial intelligence models may be further trained to detect or classify features in the intersection, such as the status of one or more traffic lights (e.g., the status of a traffic light assigned to a lane in which the vehicle is driving), or the presence of a stop sign. Each of these features can be assigned corresponding timestamps by the processor(s) 1409 that identify when the features were detected.

Once an intersection is detected, the processor(s) 1409 can monitor information from the sensors 1407 that indicate how the driver responds to the presence of the intersection. For example, the processor(s) 1409 may monitor the speed of the vehicle to determine whether the vehicle 1410 was brought to a complete stop at a red light or stop sign. Using these sensor values, the processor(s) 1409 can determine whether the driver is complaint with driving laws relating to the detected intersection. Occurrences of any violation (e.g., not coming to a complete stop at a stop sign or traffic light) can be stored in association with the respective sensor data (e.g., speed of the vehicle) when the violation occurred, to indicate the severity of the violation.

To detect driver attentiveness, the processor(s) 1409 can execute one or more artificial intelligence models over images or video that depicts the driver of the vehicle. For example, the processor(s) 1409 may execute artificial intelligence models, such as eye-tracking, facial pose detection, and/or gaze direction models that are trained in an offline process on sequences of images depicting drivers, to identify the direction that the driver is viewing while operating the vehicle. Generally, when operating a vehicle, the driver should be observing the region in front of the vehicle such that the driver may attend to any obstacles or road features that may appear. However, if the artificial intelligence models output values that indicate the driver is not attending to the environment surrounding the vehicle, the processor(s) 1409 can record the event (and any corresponding metadata, such as the duration of inattentiveness) as an inattentive driving event. By detecting the overall attentiveness of a driver over time, the processor(s) 1409 can determine the overall alertness of the driver. Likewise, the processor(s) 1409 can detect an alertness of a driver by monitoring an amount of time that the driver takes to respond to obstacles or other road features after they appear in front of the vehicle 1410. For example, if the processor(s) 1409 detect that an obstacle has appeared in front of the vehicle 1410, the processor(s) 1409 can monitor the amount of time it takes for the driver to engage the brake and slow the vehicle 1410 to a safe speed. Overall reaction time of the driver can be considered proportional to overall driver attentiveness, because a driver that is inattentive will likely take longer to respond to a potential hazard than an attentive driver.

To determine the following distance of the vehicle to other vehicles in a roadway, the processor(s) 1409 can execute one or more artificial intelligence models that are trained to detect other vehicles. The change in size of the vehicle over time can be used to calculate the distance of the vehicle 1410 from other vehicles in a roadway. In some implementations, the processor(s) 1409 can calculate the time-to-collision with another vehicle in front of the vehicle 1410 operated by the driver. The processor(s) 1409 can detect a hazardous driving event, such as an improper following distance, if the calculated time-to-collision value falls below a predetermined threshold. In some implementations, the processor(s) 1409 may receive signals from one or more LiDAR sensors that indicate the relative distance to objects in front of the vehicle 1410. The LiDAR measurements may be used to detect an instantaneous (e.g., a close-following event) or an average following distance from the vehicle 1410 to other vehicles while the driver is operating the vehicle 1410. This following distance information can be stored in memory or transmitted to the data processing server 1415 as described herein.

The local processing system 105 can communicate any detected driving events to the data processing server 1415, for example, as they are detected. In some implementations, data from the sensors 1407, the cameras 1406, or the GPS receiver 1408 may be transmitted to the data processing server 1415 in response to one or more corresponding requests. The processor(s) 1409 can communicate with the data processing server 1415 via a communications interface, such as via a WiFi signal, a 5G/LTE signal, a Bluetooth signal, a radio signal, or another type of wireless communication signal. This enables the processor(s) 1409 to communicate information to the data processing server 1415 as the vehicle is being operated by the driver. In addition, the processor(s) 1409 can receive information from the data processing server 1415, such as alert messages or other information as described herein. The alert messages can indicate that the driver has exhibited a particular driving behavior that should be corrected, and can be provided to an alert device (not pictured) within the vehicle to indicate to the driver that an improper driving behavior has been performed. In some implementations, the alert message can be an indication to the processor(s) 1409 that a particular driving behavior, when detected by the processor(s) 1409, should result in an alert. For example, personalized real-time audio feedback may be enabled for a driver of the vehicle 1410 in this way, so that the real-time feedback that the driver receives is focused on the indicated driving behavior. In response to detecting the indicated driving behavior, the processor(s) 1409 can provide an alert message to the alert device to cause the alert device to notify the driver that an improper driving behavior was observed. The alert message may include an indication of the type of driving behavior or driving event to which the alert is directed.

The alert device may be included in the local processing system 1405, and can be a device that alerts a driver of an improper driving behavior that is in need of correction. Similarly, the alert device may alert the driver of a risk-mitigating or driving behavior that should be positively reinforced. Upon receiving an alert message, the alert device can output any type of warning signal that safely alerts the driver to the driving event or behavior identified in the alert message, such as a flashing light or an auditory alarm, among others. In some implementations, the alert device can form a part of an autonomous vehicle navigation system, and can indicate to the autonomous vehicle navigation system that a particular driving event (e.g., identified in the alert message) was detected. In some implementations, the alert device can receive the alert message and cause an autonomous vehicle navigation system, if present, to perform a corrective action. If the driving event has completed or can otherwise not be avoided by further actions from the driver, the alert device may still be usefully triggered as an immediate feedback signal that may be effective in shaping future driving behavior of the driver, such as by weakening or modifying a habitual driving behavior, as described above.

The data processing server 1415 can be any type of remote computing device that can process driving events. For example, the data processing server 1415 may include many servers within a cloud computing environment. The data processing server 1415 can include processing circuitry 1420, which can include at least one processor and a memory, (e.g., a processing circuit, etc.), but may include many processing devices or computing devices in a distributed computing environment. The memory (e.g., the storage 1425) can store processor-executable instructions that, when executed by a processing circuitry 1420, cause the processing circuitry 1420 to perform one or more of the operations described herein. The processing circuitry 1420 may include a microprocessor, an ASIC, an FPGA, a GPU, etc., or combinations thereof. The storage 1425 may include, but is not limited to, electronic, optical, magnetic, or any other storage or transmission device capable of providing the processor with program instructions. The storage 1425 may be distributed across one or more computing devices or servers in a distributed computing environment, such as a cloud computing system. The instructions may include code from any suitable computer programming language.

The data processing server 1415 can perform, for example, any of the operations described in connection with FIGS. 7-13. For example, the data processing server 1415 can calculate base and transformed driver scores 1415, as well as select particular drivers that are candidates for coaching. To do so, the data processing server 1415 can receive and store driving event data, which can include any of the driving events or behaviors detected by the local processing system 105, in association with the driver of a corresponding vehicle 1410. The driving event and behavior data can be stored as the historical driving data 1430. The data processing server 1415 can receive driving event and behavior information from any number of vehicles 1410 operated by different drivers. As described herein, this aggregate information may be used to determine correspondences between certain driving events and overall accident probability for a driver, and can be used to calculate the driver scores 1435.

In addition, the data processing server 1415 can identify which driving events or behaviors, if improved (e.g., reduced in frequency), would result in an improved driver score 1435. For example, the data processing server 1415 can classify a driver into a particular category based on their driver score 1435, such as the groups depicted in FIG. 12 (which are shown as "score bins," or ranges of scores). Using the historical driving data 1430, the data processing server 1415 can determine that an improvement to the driver score 1435 would result in reassignment of the driver to another category. For example, referring to the graph in FIG. 12, if a driver is associated with a driver score of 700, they may be assigned to the "650-750" category, which corresponds to a particular accident probability. The data processing server 1415 can determine that if the driver reduces a frequency of one or more particular driving behaviors (e.g., rapid acceleration), the driver score 1435 for the driver would improve to 875. A driver score of 875 would cause the driver to be reassigned to another category, in this case the "850-950" category, which is associated with a reduced accident probability.

When these driving behaviors for such drivers are identified, the data processing server 1415 can select the driver to receive alerts when those driving behaviors are detected. The data processing server 1415 receives real-time data from the local processing system 1405 as the driver operates the vehicle 1410, and can therefore transmit an alert message to the local processing system 1405 when the driving behavior is detected. In some implementations, the alert message can cause the vehicle 1410 to alert the driver (e.g., with an auditory or visual alert, the type of which may be selected by the data processing server 1415) to the detected driving behavior. In some implementations, the data processing server 1415 can transmit an alert message to the local processing system 1405 that causes the local processing system 1405 to generate an alert whenever the identified driving event occurs. The alert message can include instructions that cause the local processing system 1405 to enable an alert type corresponding to the identified driving event or driving behavior. For example, the local processing system 1405 may store a lookup table with associations between driving behaviors and alert types, along with a configuration setting for each driving behavior that indicates whether alerts for that driving behavior are enabled. The local processing system 1405 can modify the configuration setting in response to receiving the instructions from the data processing server 1415 to enable the alert type for the identified driving behavior. In some implementations, the alert message can include a type of alert (e.g., auditory or visual) to provide to the driver in response to the driving behavior identified in the alert message. In some implementations, the data processing server 1415 can store occurrences of these alert messages as the alerts 1440. Further details of selectively transmitting alerts based on monitored behavior of drivers are described in connection with FIG. 15.

Figure 15:
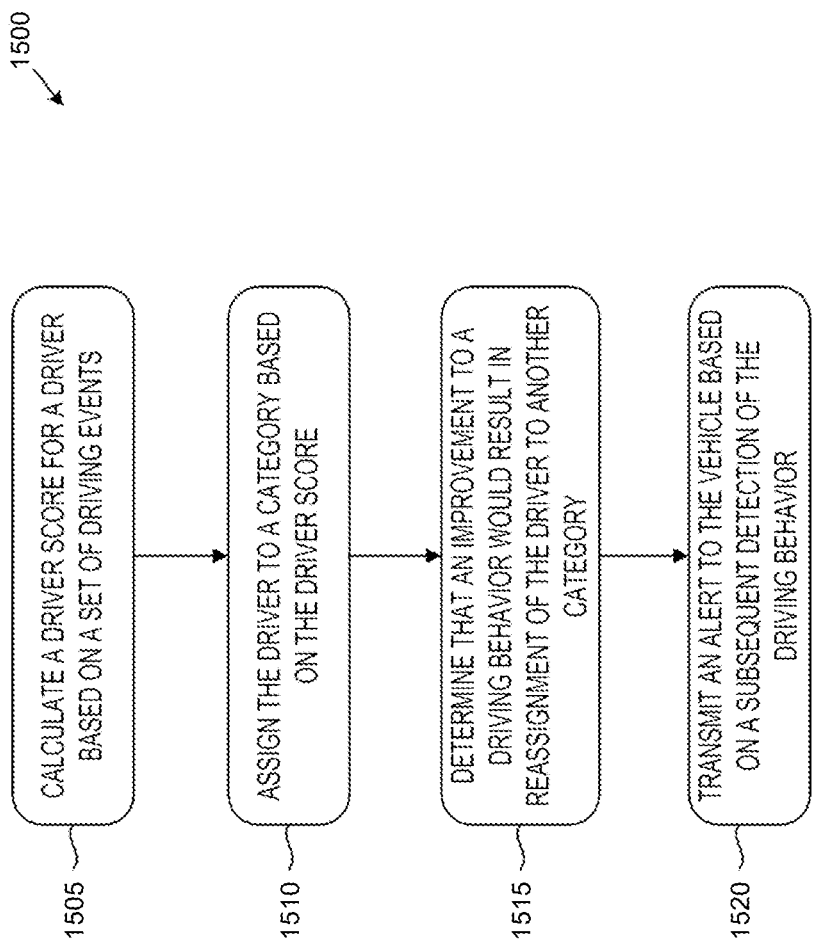
FIG. 15 illustrates a flow diagram of an example method for selectively transmitting alerts based on monitored behavior of a driver in accordance with certain aspects of the present disclosure.

Referring to FIG. 15, depicted is a flow diagram of a method 1500 for selectively transmitting alerts based on monitored behavior of a driver. The method 500 includes steps 1505-1520. However, other embodiments may include additional or alternative steps, or may omit one or more steps altogether. The method 1500 is described as being executed by a computing device, such as the data processing server 1415 described in connection with FIG. 14.

At step 1505, the data processing server (e.g., the data processing server 1415) can calculate a driver score for a driver based on a set of driving events. The driver score can be, for example, the driver score 1435 described in connection with FIG. 14, and may be or include the driver transformed driver scores described in connection with FIGS. 7-13. The data processing server can calculate the driver score for the driver based on a set of driving events detected from sensor data captured while a vehicle was operated by the driver. As described herein above, the sensor data can include LiDAR information, images or videos of the driver or the roadway in front of the vehicle, acceleration information, braking information, GPS coordinates, indications that the vehicle is turning, or other information. The sensor information may undergo edge-processing (e.g., the operations performed by the local processing system 1405 described in connection with FIG. 14) to detect the one or more driving events, which may be transmitted to the data processing server via a wireless communication interface. The data processing server can receive the driving events, which may be associated with corresponding time stamps, and store the driving events in association with an identifier of the driver for further processing.

Each driving event of the set of driving events can be associated with one or more monitored driving behaviors. Some non-limiting examples of monitored driving behaviors can include speeding, rapid or sudden acceleration, rapid or sudden braking (a "hard" braking event), rapid or sudden turns, turns at unsafe speeds, U-turns, an instantaneous or momentary unsafe following distance (e.g., a near-collision event), an average unsafe following distance, an overall lack of alertness or attentiveness of the driver, or improper driving behavior of the driver at stop lights, stop signs, or intersections (e.g., indications of whether the driver has completely stopped the vehicle at a red light, whether the driver has legally navigated the vehicle 1410 through an intersection), among others. These monitored driving behaviors of a driver in different driving scenarios can each be correlated (e.g., using the operations described in connection with FIG. 7) to a corresponding likelihood that the driver will be involved in an accident. Drivers that exhibit more unsafe driving behaviors may be more likely to be involved in an accident. To quantify this likelihood, the data processing server can calculate a driver score for the driver that is negatively correlated with accident probability (e.g., a lower score indicates a higher accident probability than a higher score).

The data processing server can calculate the driver score based on both real-time (or recent) and historic driving event data for the driver. The historic driving event data can include accident records, for example, that indicate when and under what circumstances a driver was involved in a collision or other type of driving accident. In addition, when correlating particular driving events or behaviors to overall accident probability generally, aggregated data across many drivers may be utilized. In particular, the historical driving data may be utilized to generate a set of factors (e.g., a factor definition process) that correspond to particular accident events. The data processing server may construct a historical distribution of captured driving events or behaviors in the historical driving event data to define multiple factors that quantify different types of traffic compliance or non-compliance.

The factors can be monotonic functions of similar events or behaviors (e.g., "full stop" stop sign events and "no stop" stop sign events may be compared to determine a single factor) whose value corresponds to a severity of the event or behavior. The factors may be scaled so that their values range between 0 to 1 where 0 may correspond to maximum noncompliance and I may correspond to minimum non-compliance of the same alert type. In other words, the compliance value for a particular driving behavior can be expressed as a percentage of compliant driving actions based on the number of opportunities for the compliant driving action. For example, the value for compliance at a stop sign may be expressed as 0.98 (or 98%) if the driver fails to come to a full stop at two percent of the stop signs that are encountered within a predetermined time period. These factors may be defined to have a negative correlation with accident probability. Non-compliant driving behaviors that occur more frequently will have values that are closer to zero, and therefore indicate higher accident risk. Likewise, non-compliant driving behaviors that occur less frequently relative to the number of opportunities for the driving behavior will have values that are closer to 1, and therefore indicate a lower accident risk. For example, driving behaviors that indicate a driver did not come to a full stop at 2% of stop signs encountered within the last month may have a value of 0.98 (indicating that, although non-compliant, the incidents have relatively low severity). In contrast, driving behaviors that indicate a driver failed to come to a complete stop at 50% of encountered stop signs within the last month would have a value of 0.50, indicating behavior with high severity.

Various configurations can define driving behaviors as either "compliant" behaviors or "non-compliant" behaviors. Furthering the example above, the definitions of compliant and non-complaint behaviors at stop signs may be defined to address different levels of severity. For example, to focus only on severe driving events at stop signs, behaviors such as a "rolling stop" may be defined as compliant driving behaviors, while completely ignoring a stop sign may be defined as a non-compliant driving behavior. In such a case, a driver that only comes to a complete stop at 90% of stop signs, but comes to a rolling stop at 9% of stop signs would be associated with a factor value of 0.99 for stop sign compliance. However, if the rolling stop behavior were defined as a non-compliant behavior, the same driver would have a compliance value of 0.90 for stop sign behavior.

Although the compliance values for behaviors have been described herein for a stop sign scenario, it should be understood that factors can be defined for any of the driving behaviors and driving scenarios described herein, including the behavior of drivers at traffic lights.

Defining factors to be negatively correlated with accident probability can allow drivers to be grouped according to their overall likelihood of being in a driving accident. By determining and scaling factors appropriately, the overall contribution of a particular driving behavior to accident probability can be identified, and used to generate alerts for particular drivers. Because all of the factors are defined along a compliance or non-compliance axis, this ensures that the driving behaviors will be identified for which greater compliance entails lower collision risk. By alerting drivers to non-compliance with certain driving behaviors that are determined to be relevant factors, the data processing server can create effective and more immediate changes in driving behavior that manual coaching processes.

To calculate the driving score from the set of driving events received from the vehicle, a factor-accident correlation value can be calculated from each driving factor derived from the historic driving event data. The factor accident correlation can be calculated by defining a search space with different parameter configurations of a set of standard functions (e.g., tan h, sigmoid, other standard functions). The data processing server can calculate the factor-accident correlations for all configurations based on the occurrences of driving behaviors and accidents in the historic driving data, and can select the configuration (e.g., the function and parameter configuration) with the highest negative correlation. The factor-accident correlations can then be used to calculate a respective factor weight value for each factor derived from the historic driving event data. The factor weight values can be defined as monotonic functions of factor-accident correlation, where the highest weight is assigned to factor with maximum negative correlation with accident probability. In some implementations, weights of factors that are positively correlated with accident probability may be ignored or set to negligible weight values. In some implementations, the data processing server can normalize the factor weights, such that the sum of all factor weights is equal to 1.

The calculation of factor weights may be performed on a periodic basis (e.g., weekly, monthly, etc.), such that the factor weights accurately reflect driving behaviors and factors that are negatively correlated with accident probability. The factor weights can be used to calculate the driver score for any number of drivers based on real-time (or recent) driving data. To calculate the driver score for a driver, the data processing server can receive driving event data from a vehicle, for example, during operation of a vehicle or after the driver has ceased operation of the vehicle. The data processing server can calculate factor values for each of the factors identified in the driving event information. The data processing server can then apply the weight values to the factors identified in the driving event data to calculate a base driving score. The base driving score for the driver may be calculated, for example, using the following formula:

$$S = 1000 * \sum_i w_i * f_i,$$

Where S is the base driver score for the driver, each $f_i$ represents a respective factor value derived from the driving event data, and each $w_i$ represents the respective factor weight value for each factor $f_i$ calculated from the historic driving event data.

In some implementations, the data processing server may apply a transformation function to the base driver score to calculate a transformed driving score for the driver. To calculate the transformed driver score, the data processing server may execute a fitting function over a set of driver scores for the driver. For example, the transformation fitting function may be applied on a daily historical base score of each driver for a specified duration (for example, 6 months) and aggregated (weighted average based on daily drive time) to a single score for each driver. As such, the transformed score may be a more accurate reflection of driver performance and driver safety than the base score for a particular time period. The base score and the transformed score can be stored in association with an identifier of the driver, and can be associated with a respective timestamp corresponding to when the scores were calculated.

At step 1510, the data processing server can assign the driver to a category based on the driver score. The categories can correspond to particular "bins" or sets of drivers that have similar scores, and therefore similar accident probability. In some implementations, the data processing server can assign the driver to a particular category by determining that the driver score falls within a range of driver scores associated with the category. Examples of such categories are shown in FIG. 12, which show five driver categories that are each associated with a respective range of driver scores. In some implementations, a driver can be assigned to a category based on driver scores of other drivers, such as other drivers in the same fleet of drivers. For example, the driver scores of each driver in a fleet or selected group of drivers can be sorted by the data processing system according to their driver scores and divided into a predetermined number of equal sized categories (or groups), that each have a predetermined number of drivers assigned to each category. The data processing server can store an identifier of the category to which a driver is assigned with an identifier of the driver, indicating that the driver is assigned to the category.

At step 1515, the data processing server can determine that an improvement to a monitored driving behavior would result in reassignment of the driver to another category. As described herein, certain factors may have a higher correlation with accident probability than other factors. For example, higher occurrences of U-turns may have a relatively low negative correlation with accident probability, while occurrences of inattentiveness may have a relative high negative correlation with accident probability. To determine which driving behaviors a driver can improve, the data processing server can determine a contribution amount of the each monitored driving behavior to the driver score for the driver.

To do so, the data processing server can analyze both recent and historic driving events associated with the driver and calculate factor values for each factor identified in the driving data. In some implementations, more recent driving behavior can be weighted higher than much older driving event data. As described herein above, the contribution of a factor to the driving score can be calculated based on the weight value $w_i$ for each factor value $f_i$. Because each factor is negatively correlated with accident probability, factor values that are highly weighted (e.g., a large $w_i$), but have a low value of $f_i$ for the driver contribute the most to a lower driver score. The data processing server can identify a subset of the factor values $f_i$ that are relatively low (e.g., compared to other drivers), and sort these values by their associated weight values $w_i$. The data processing server can select one or more of the top-ranking factor values in the subset to improve for the driver. In some implementations, the data processing server can select the factors in the subset that correspond to driving behaviors that the driver performed with a high frequency (e.g., the data processing server can determine a frequency of each driving behavior from the historic driving behaviors, and compare the frequency values of corresponding factors in the subset).

To determine whether an improvement to the selected factors will result in reassignment of the driver to another category, the data processing server can temporarily increase each of the selected factors (e.g., thereby simulating improved driving behavior), for example, by a predetermined amount, and then recalculate the driver score for the driver. The data processing server can then determine the category to which the driver would be assigned if they had the recalculated driver score. If the new category is different from the current category, the data processing server can determine that an improvement to the selected subset of factors would result in reassignment of the driver to a new category, and therefore a lower accident probability. The data processing server can further identify which driving behaviors are associated with the selected subset of factors by performing a lookup in the memory of the data processing system. The data processing server can store a list of each of the identified driving behaviors as flagged behaviors that should result in an alert to the driver. The data processing server can then generate alert messages for the driver when the data processing server detects subsequent occurrences of those driving behaviors.

At step 1520, the data processing server can transmit an alert to the vehicle of the driver based upon a subsequent detection of the driving behavior. As described herein, a computing device integrated with the vehicle of a driver can perform edge-processing to detect and transmit driving events to the data processing server in real-time. Upon receiving the driving event data from the vehicle, the data processing server can compare the received driving events to the driving events identified in the list of flagged driving events. If there is a match, the data processing server can transmit an alert message to the vehicle, which can activate an alert device within the vehicle to indicate to the driver that a particular driving event occurred. This can help alert drivers to behaviors that might otherwise be unconscious behaviors, and therefore difficult to self-identify.

In some implementations, the data processing server can generate the alert message in response to detecting the flagged driving event. The data processing server can generate the alert message to identify a type of alert (e.g., visual, auditory, or another type of alert), and can include an identifier of the flagged driving behavior in the alert. In some implementations, the data processing server can select an alert type from a list of alert types that are each associated with a corresponding driving event or driving behavior. When the data processing server detects a particular flagged driving behavior, the data processing server can select a predetermined alert that is associated with the flagged driving behavior. Once the alert has been generated or selected, the data processing server can transmit the alert to the computing device of the vehicle to alert to alert the driver of the flagged driving behavior.

Score Simulator

According to certain aspects, a "score simulator" may be used to assist in the selection of which driving scenario or scenarios should be targeted for change by a driver. Certain aspects of the above disclosure may operate subconsciously on habit circuits in the brain, but these aspects may work in conjunction with systems and methods that enable the driver to set goals, modify goals, and in general tailor a driving safety program according to the driver's own preferences. That is, according to certain aspects, goal setting and progress tracking tools may be made available to a driver so that the driver may set and refine safety goals for him or herself. The driver could follow an iterative cycle of goal setting and progress tracking steps to ensure the progression towards the target goal. Goal setting may be iterations may be scheduled every one or two weeks, for example. The driver may thereby further refine the selection of driving scenarios for active monitoring and timely feedback, and thus which driving behaviors are selected for habitual (physiological) change.

Simulation of contributing values for factors of a summary safety score may assist a driver or fleet to inculcate safe driving practices to meet a target summary safety score, which may include meeting a target summary safety score that would place a driver into a lower risk category.

As described above, a driving score may be based upon various descriptive statistics related to a driver's behavior in various driving scenarios. The overall driving safety score and the contributing values for factors (each factor associated with a driving scenario) may provide a view of a driver relative to their fleet. It also offers insights into compliance, event distribution, opportunities for coaching, etc. However, there may not be prescriptions (or recommendations or action items) for a driver or fleet manager on what the driver can do to meet a fleet target goal for the overall driving safety score, or for a driver to achieve increments to their driving safety score. Even if there are recommendations, such as based on a determination that a change in driving behavior associated with one driving scenario could place the driver in a different risk category (as described above), the driver still may wish to select among the recommendations or to explore whether changes to habitual driving behaviors in other non-recommended driving scenarios might achieve a comparable safety target.

Certain aspects disclosed herein facilitate the selection of one (or more) monitored driving scenarios on which a driver may choose to selectively transmit alerts. In some embodiments, as described above, the selection of a driving scenario for active monitoring may be based on a determination that a change in a habitual driving behavior by the driver in that driving scenario would result in reassignment of the driver to another category of collision risk. In addition, as described in this section, the selection of a driving scenario for active monitoring may be based on an interactive process involving a score simulator.

In a first embodiment, a system may be configured to derive a number, N, of recommendations that have the potential to be the most consequential (the "top-n" recommendations) in terms of changes to contributing values for certain factors of the summary safety score. Each of the top-N recommendations, if enabled to change or modify a habitual driving behavior in a corresponding driving scenario, could achieve a change in a summary safety score, such that some combination of active monitoring among the driving scenarios of the top-n recommendations could achieve a target summary safety score. The selected recommendations from the top-n recommendations would then, through the action of timely feedback in subsequently detected driving behaviors, result in behavioral changes on the part of the driver that may result in the driver meeting the target summary safety score.

In some embodiments, the value of "n" can be selected by the user, where the user may be a driver, a safety manager, and the like. The value of n may vary from 1 to the count of factors that are a part of the set of factors used to determine the summary safety score.

Figure 17:
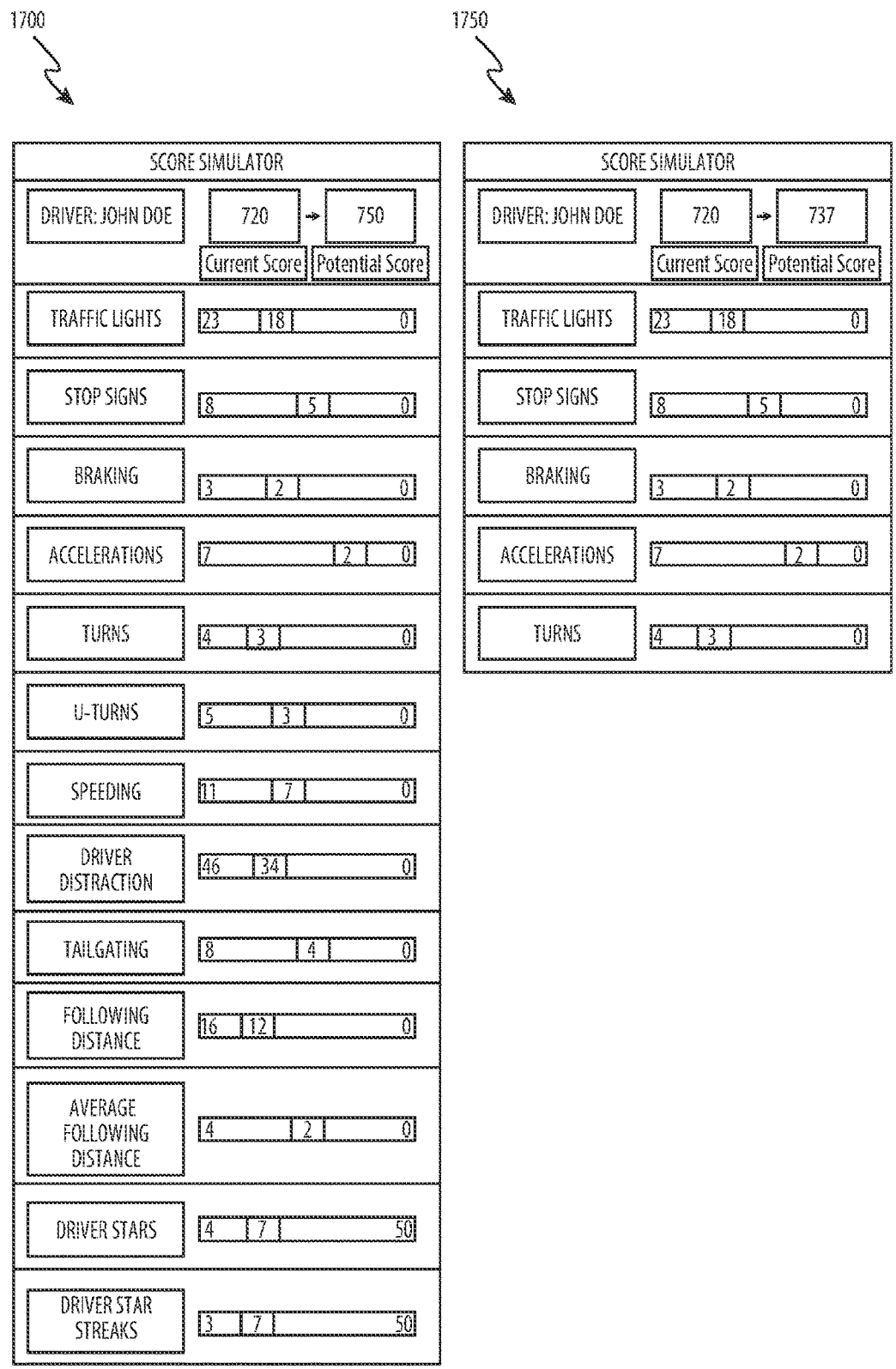
FIG. 17 illustrates a score simulator in accordance with certain aspects of the present disclosure.

The potential change in contributing values for a factor could be provided in a user interface, such as a graphical depiction of score factors, examples of which are illustrated in FIGS. 16 and 17. The potential change may be depicted as a change in event detections, as illustrated in FIG. 16, a change in score factor points, as illustrated in FIG. 17, or a change in compliance percentage (not shown) that would then result in a certain change to the summary safety score. The change may be prescribed over a certain timeframe that could be either days or weeks or months. Multiple combination of values for the n contributing factors may yield the same potential summary safety score.

The top-n recommendations provide a concrete plan to the driver to be able to meet a specific target goal for a summary safety (overall driving safety) score. The recommendations are prescribed by the system and are personalized for an individual driver relative to the current state of the contributing values for a factor and the summary safety score of the individual driver. It thus becomes easier for the driver to follow a certain quantified plan, and to choose among available options for improvement. This approach may be more engaging and effective in comparison to an approach in which driver is told to qualitatively improve on specific factors without knowing which factors are associated with the greatest opportunity of risk reduction. Such a plan would provide a motivation to the driver and a means for the safety manager to be able to track progress of the driver as per the laid-out plan.

Panel 1600 illustrates thirteen score components that, if executed and achieved would increase a current score of 720 to a potential score of 750. Panel 1600, for example, visually depicts a recommendation that the driver attempt to reduce traffic light violations from a count of 23 per period to a count of 18, stop sign violations from a count of 8 to a count of 5, and so on. As can be seen near the bottom of Panel 1600, some driving scenarios, including Driver Stars, Driver Star Streaks, and Following Distance are safer when there are high values (more detected Driver Star events and greater average or mediate following distance are safer than less). Panel 1600 depicts the effect of moderate improvements to all driving scenarios. The result of such across-the-board safety improvements would result in an overall safety score of 750. In some embodiments, scores of 750 and 720 may be in different risk group categories.

Panel 1650 illustrates the top-3 recommendations. Because the magnitude of recommended changes for each scenario are the same as they are in panel 1600, but there are fewer recommendations, the overall impact on the driver's score will be less. In this top-3 recommendation version, achievement of the recommendations would increase a current score of 720 to a potential score of 731. Still, the driver may prefer to work on (monitor) fewer driving scenarios at a time, and by doing so, may achieve greater safety gains in each of the selected driving scenarios.

While the top-n recommendation technique is described for one specific driver, it can be also applied to an entire fleet. When applied for a driver, the contributing values for each factor could be the average for a specific period for that driver, where the specific period could be a week or month.

When applied for a fleet, the contributing values for each factor could be the average across all drivers in the fleet for a specific period. By selecting among the recommendations at a fleet-level, the drivers may motivate each other by sharing common goals.

In addition to communicating to a driver how one or more changes in score factors may affect an overall driving safety score, certain aspects are directed to illustrating how different magnitudes of habitual change will map to different changes in a score (and thus a safety or risk profile of the driver). As illustrated in FIG. 17, a driver or safety manager may be presented with adjustable slider. The driver, for example, may adjust a slider for each factor that contributes to his summary safety score. Increasing the contributing value for a factor that is positively correlated with the summary safety score will increase the summary safety score and vice-versa. Increasing the contributing value for a factor that is negatively correlated with the summary safety score will reduce the summary safety score and vice-versa. The driver or safety manager can perform this simulation on all factors that constitute the summary safety score, as illustrated in panel 1700, or they may select a smaller subset of the factors, as illustrated in panel 1750, per their own preference. Moving the slider for a specific factor would cause a change to the potential score. Increasing the contributing value for a factor that is positively correlated with the summary safety score would increase the potential score and vice-versa. Increasing the contributing value for a factor that is negatively correlated with the summary safety score would reduce the summary safety score and vice-versa. The driver or safety manager may sequentially move the sliders for multiple factors to observe the change to the summary safety score and then choose a combination of summary safety score factor values as per their liking. The driver or safety manager can also choose a certain subset of factors to perform this simulation. The driver may have an issue with specific summary safety score factors that they need to improve upon more than others. Alternatively, the driver may feel they have more control over their behavior on certain factors over others and may be comfortable or confident on improving on those specific factors.

One advantage of this approach is that the driver or safety manager have more control over which specific factors they would like to focus on in the simulation to observe the improvement in the potential score. The driver could focus on all the score factors, or a subset of the score factors depending on their potential to improve the score or based on comfort around improvement in driving behavior for certain factors. This mechanism provides a personalized plan for the driver that the drivers themselves can create or one that can also be created for the driver by or in collaboration with the safety manager. The driver or safety manager can observe changes to the summary safety score by tweaking contributing values for each factor that contributes to the summary safety score.

It may be difficult for a driver whose current summary safety score is substantially below the fleet target score to hit the target in a short time. It may be more feasible for the safety manager to work with the driver to set incremental goals over a few weeks or a few months and achieve the target summary safety score in steps. Accordingly, after selecting a target safety score, the system may determine a set of intermediate goals, the system may monitor progress over time intervals, and may incrementally reach the target summary safety score. The simulation system may thus provide a means to set and track incremental targets that may be more realistic to achieve for the driver.

In another embodiment, a safety manager may provide a personal target for a subset of the drivers and attach an incentive on meeting the target. An objective plan created via a simulation provides motivation to the driver and a means for the safety manager to monitor and track progress. An example target provided by the safety manager could be "If you reduce stop-sign violations by 10% per week to achieve a lift in summary safety score of 15 points after four weeks then you could qualify for an additional bonus of $100."

Accordingly, a personalized plan for a change to a habitual driving behavior may be outlined by a simulation created by the driver or safety manager or based on a recommendation given to the driver or safety manager by the system. The driver's summary safety score and its components may be tracked of over a period of days or weeks or months and provide a view of actual changes to contributing values for a summary safety score factor against planned changes to the contributing values for a summary safety score factor. This scaffolding may help the driver and safety manager get a view into how and why changes to their habitual driving behavior as per the prescribed plan did or did not help them achieve the target summary safety score.

Changes initiated by a driver or safety manager to the magnitude of a simulated score component change could also be applied in an interface using editable fields, as in panel 1670 of FIG. 16. In such embodiments, the score factor values in the right would be editable, and each change would result in a change in the potential score. The user could also deselect or delete a score factor and observe changes to the potential score. The current and potential summary safety score itself is non-editable.

In some embodiments, a summary safety score simulator may be accessed by drivers via a Mobile App or on the IDMS website. Safety Managers can use the summary safety score simulator via the IDMS website.

In some embodiments, a score simulator may be offered as an API for integration into custom applications. For example, a custom application may be built by a fleet company that employs drivers that drive vehicles with a camera based safety solution. In another example, a score simulator may be integrated into a fleet telematics platform. For an API, inputs may include the Driver's Current Score, Potential Score, and a list of Score Factor names and Score Factor value pairs. The API may then return a list of Score Factor names and Score Factor value pairs that would achieve the Potential Score.

In various embodiments, one or more mechanisms may be implemented for a score simulator. A mechanism may be implemented to view recommendations on what changes need to be made to contributing values for all score factors to achieve a certain target score within a certain timeframe. The target score could either be the fleet target score or a specific score set by the driver or safety manager. A mechanism may be implemented to view recommendation on what changes need to be made to contributing values to specific score factors to achieve a certain target score within a certain timeframe. The target score could either be the fleet target score or a specific score set by the driver or safety manager. A mechanism may be implemented to select one or more or all factors and provide a change to the contributing value of each of the factors (as either change in points or a percentage change, for example) and observe the change to summary safety score over a certain timeframe. A mechanism may be implemented to pick one or more factors and a target summary safety score within a certain timeframe and then observe one or more combinations of contributing values (as either a change in points or a percentage change, for example) for those factors that would achieve the target score. This would choose specific values for all chosen score factors that would result in the target summary safety score. A mechanism may be implemented for the system to accept the target summary safety score, a choice of either all score factors or a subset of score factors of interest after which the system would choose a default number of intervals of time and provide the changes to the contributing values for each score factor at each interval of time. The chosen interval could either be days or weeks or months. A mechanism may be implemented for the system to accept the target summary safety score, a choice in terms of the number of intervals over which the increase in summary safety score is to be met, a choice of summary safety score factors after which the system would calculate the changes to contributing values for each chosen score factor over each interval. The chosen interval could either be days or weeks or months.

As used herein, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a–b, a–c, b–c, and a–b–c.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The operations described in this specification can be implemented as operations performed by a data processing apparatus on data stored on one or more computer-readable storage devices or received from other sources.

The terms "data processing apparatus", "data processing server", "local processing system", "computing device", or "device" can encompass all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA or an ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user: a keyboard: and a pointing device, e.g., a mouse, a trackball, or a touchscreen, by which the user can provide input to the computer. Other kinds of devices can be used to provide for interaction with a user as well: for example, feedback provided to the user can include any form of sensory feedback, e.g., visual feedback, auditory feedback, or tactile feedback: and input from the user can be received in any form, including acoustic, speech, or tactile input. In addition, a computer can interact with a user by sending documents to and receiving documents from a device that is used by the user.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the computing devices described herein can each be a single module, a logic device having one or more processing modules, one or more servers, or an embedded computing device.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of selectively transmitting alerts based on monitored behavior of a driver, the method comprising:

calculating, by one or more processors, a driver score for the driver based on a set of driving events, wherein each driving event of the set of driving events was detected from sensor data captured while a vehicle was operated by the driver, and wherein each driving event of the set of driving events is associated with a driving behavior in at least one driving scenario of a plurality of driving scenarios;

assigning, by the one or more processors, the driver to a category based on the driver score, wherein the category is one of a plurality of categories;

determining, by the one or more processors, that a change in a habitual driving behavior by the driver in a monitored driving scenario would result in reassignment of the driver to another category of the plurality of categories, wherein the monitored driving scenario is a driving scenario of the plurality of driving scenarios;

detecting, by the one or more processors, from second sensor data captured by a vehicle operated by the driver, a driving event that is associated with the monitored driving scenario;

generating, by the one or more processors, an alert responsive to detecting the driving event having occurred, wherein the alert communicates that the change in the habitual driving behavior by the driver in the monitored driving scenario would result in reassignment of the driver to another category; and transmitting, by the one or more processors, the alert to the vehicle operated by the driver based upon the determination that the change in the habitual driving behavior by the driver in the monitored driving scenario would result in reassignment of the driver to another category.

2. The method of claim 1, wherein the plurality of driving scenarios comprise a stop sign scenario and a traffic light scenario, and wherein calculating the driver score for the driver is based on at least a habitual driving behavior of the driver in the stop sign scenario and a habitual driving behavior of the driver in the traffic light scenario.

3. The method of claim 1, wherein assigning the driver to the category further comprises determining, by the one or more processors, that the driver score falls within a range associated with the category.

4. The method of claim 1, wherein determining that the change in the habitual driving behavior by the driver in the monitored driving scenario would result in reassignment of the driver to another category further comprises:

determining, by the one or more processors, a contribution amount of the monitored driving scenario to the driver score; and determining, by the one or more processors, that a change to the contribution amount of the monitored driving scenario would change the driver score to fall within a range of a second category of the plurality of categories.

5. The method of claim 1, wherein the habitual driving behavior is one of an unsafe speed, an unsafe following distance, and a non-compliant behavior around traffic signs or traffic lights.

6. The method of claim 1, wherein determining that the change in the habitual driving behavior by the driver in the monitored driving scenario would result in reassignment of the driver to another category further comprises determining, by the one or more processors, a frequency of the habitual driving behavior based on the set of driving events.

7. The method of claim 1, wherein the plurality of categories each correspond to a respective likelihood that the driver will be in an accident based on historical data.

8. The method of claim 1, wherein transmitting the alert to the vehicle operated by the driver further comprises transmitting, by the one or more processors to the vehicle operated by the driver, instructions that enable the vehicle operated by the driver to alert the driver upon a subsequent detection of a driving event that is associated with the monitored driving scenario.

9. A system for selectively transmitting alerts based on monitored behavior of a driver, the system comprising:

one or more processors coupled to a non-transitory memory, the one or more processors configured to:

calculate a driver score for the driver based on a set of driving events, wherein each driving event of the set of driving events was detected from sensor data captured while a vehicle was operated by the driver, and wherein each driving event of the set of driving events is associated with at least one driving behavior in at least one driving scenario of a plurality of driving scenarios;

assign a category to the driver based on the driver score, wherein the category is one of a plurality of categories;

determine that a change in a habitual driving behavior by the driver in a monitored driving scenario would result in reassignment of the driver to another category of the plurality of categories, wherein the monitored driving scenario is a driving behavior of the plurality of driving behaviors;

detect, from second sensor data captured by a vehicle operated by the driver, a driving event that is associated with the monitored driving scenario;

generate the alert responsive to detecting the driving event having occurred, wherein the alert communicates that the change in the habitual driving behavior by the driver in the monitored driving scenario would result in reassignment of the driver to another category; and transmit the alert to the vehicle operated by the driver based upon the determination that the change in the habitual driving behavior by the driver in the monitored driving scenario would result in reassignment of the driver to another category.

10. The system of claim 9, wherein the plurality of driving behaviors comprise a stop sign scenario and a traffic light scenario, and wherein the one or more processors are further configured to calculate the driver score for the driver based on at least a habitual driving behavior of the driver in the stop sign scenario and a habitual driving behavior of the driver in the traffic light scenario.

11. The system of claim 9, wherein to assign the category to the driver, the one or more processors are further configured to determine that the driver score falls within a range associated with the category.

12. The system of claim 9, wherein to determine that the change to the habitual driving behavior in the monitored driving scenario would result in reassignment of the driver to another category, the one or more processors are further configured to:

determine a contribution amount of the monitored driving scenario to the driver score; and determine that a change to the contribution amount of the monitored driving scenario would change the driver score to fall within a range of a second category of the plurality of categories.

13. The system of claim 9, wherein the habitual driving behavior is one of an unsafe speed, an unsafe following distance, and a non-compliant behavior around traffic signs or traffic lights.

14. The system of claim 9, wherein to determine that the change in habitual driving behavior in the monitored driving scenario would result in reassignment of the driver to another category, the one or more processors are further configured to determine a frequency of the habitual driving behavior based on the set of driving events.

15. The system of any of claim 9, wherein the plurality of categories each correspond to a respective likelihood that the driver will be in an accident.

16. The system of claim 9, wherein to transmit the alert to the vehicle operated by the driver, the one or more processors are further configured to transmit, to the vehicle operated by the driver, instructions that enable the vehicle operated by the driver to alert the driver upon a subsequent detection of a driving event that is associated with the monitored driving scenario.

\* \* \* \* \*